(12) United States Patent
Graham

(10) Patent No.: US 12,600,583 B1
(45) Date of Patent: Apr. 14, 2026

(54) CARGO-CARRYING SYSTEMS, METHODS OF LOADING A CARGO-CARRYING SYSTEM, AND SYSTEMS FOR LOADING THE CARGO-CARRYING SYSTEM

(71) Applicant: GREEN SWAN TECHNOLOGIES, LLC, Munster, IN (US)

(72) Inventor: Timothy Scott Graham, Blenheim (CA)

(73) Assignee: Green Swan Technologies, LLC, Munster, IN (US)

( * ) Notice: Subject to any disclaimer, the term of this patent is extended or adjusted under 35 U.S.C. 154(b) by 0 days.

(21) Appl. No.: 19/262,506

(22) Filed: Jul. 8, 2025

Related U.S. Application Data

(60) Provisional application No. 63/804,887, filed on May 13, 2025, provisional application No. 63/798,993, filed on May 2, 2025, provisional application No. 63/796,521, filed on Apr. 29, 2025.

(51) Int. Cl.
B65G 67/00 (2006.01)
B65G 67/20 (2006.01)

(52) U.S. Cl.
CPC .................................... B65G 67/20 (2013.01)

(58) Field of Classification Search
CPC .. B60P 1/02; B60P 1/022; B60P 1/025; B60P 1/6445; B60P 1/4414; B60P 1/4435; B60P 1/445; B65G 67/04; B65G 67/22; B65G 69/30
USPC .......................... 410/152; 414/391, 399, 809
See application file for complete search history.

(56) References Cited

U.S. PATENT DOCUMENTS

| | | | | |
|---|---|---|---|---|
| 444,227 | A | * | 1/1891 | Tiffany ................ B65G 49/068 |
| | | | | 414/399 |
| 3,762,335 | A | | 10/1973 | Baker, Jr. et al. |
| 4,082,195 | A | | 4/1978 | Wnek |
| 4,223,792 | A | | 9/1980 | Aspen |
| 4,772,176 | A | | 9/1988 | Montgomery |
| 4,887,706 | A | | 12/1989 | Gladish et al. |
| 4,997,335 | A | | 3/1991 | Prince |
| 6,814,532 | B1 | | 11/2004 | Thompson et al. |
| 7,568,877 | B1 | | 8/2009 | Nespor |
| 7,665,788 | B2 | | 2/2010 | Dibdin et al. |
| 8,668,426 | B1 | | 3/2014 | Baron |
| 9,428,097 | B2 | | 8/2016 | Konchan et al. |
| 10,577,180 | B1 | | 3/2020 | Mehta et al. |
| 11,186,214 | B2 | | 11/2021 | Das et al. |
| 11,679,939 | B1 | | 6/2023 | Krishnamoorthy et al. |
| 2011/0238207 | A1 | | 9/2011 | Bastian, II et al. |
| 2014/0014463 | A1 | | 1/2014 | Haukaas et al. |

(Continued)

FOREIGN PATENT DOCUMENTS

| | | |
|---|---|---|
| CN | 108839604 | 6/2021 |
| DE | 1911665 | 3/1965 |

(Continued)

*Primary Examiner* — Stephen T Gordon

(74) *Attorney, Agent, or Firm* — Dicke, Billig & Czaja, PLLC

(57) ABSTRACT

Described are cargo-carrying systems, methods of loading and unloading the cargo-carrying systems, and systems for loading and unloading the cargo-carrying systems, with examples of the cargo-carrying systems being useful as removable cargo carriers that can be loaded into and carried for transport in a top-loading cargo transport vessel.

16 Claims, 42 Drawing Sheets

(56) References Cited

U.S. PATENT DOCUMENTS

2021/0347587 A1* 11/2021 Levi ........................ B65G 67/20
2023/0399172 A1* 12/2023 Saraswat ................ B65G 67/02

FOREIGN PATENT DOCUMENTS

| | | |
|---|---|---|
| DE | 8233784 | 12/1983 |
| DE | 3244497 | 6/1984 |
| DE | 19532727 | 3/1997 |
| DE | 19818875 | 11/1999 |
| EP | 0901427 | 7/2003 |
| EP | 2179947 | 12/2010 |
| EP | 3222463 | 12/2019 |
| EP | 3483003 | 6/2024 |
| JP | 2002-265017 | 9/2002 |
| JP | 3680032 | 5/2005 |
| JP | 2006-123809 | 5/2006 |
| JP | 5338746 | 8/2013 |
| WO | 99/35004 | 7/1999 |
| WO | 00/64700 | 11/2000 |
| WO | 2023/137544 | 7/2023 |
| WO | 2024/113053 | 6/2024 |

* cited by examiner

Deck 120 is moved vertically from a location below frame 102, through bottom opening 112 of frame 102, into frame space 114.

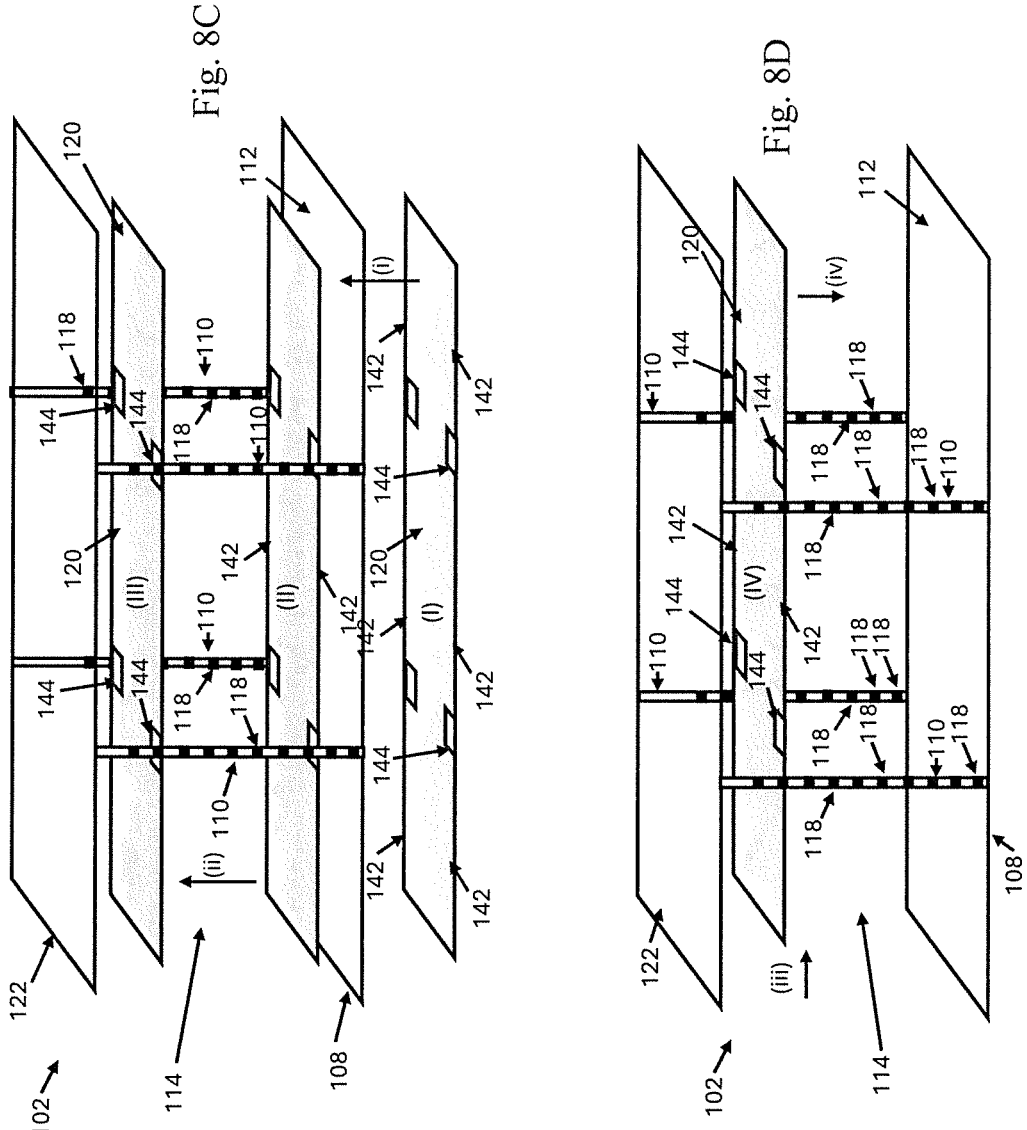
Fig. 8C
Fig. 8D
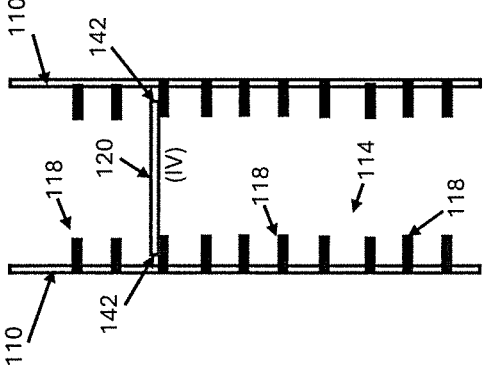
Fig. 8E

1

CARGO-CARRYING SYSTEMS, METHODS OF LOADING A CARGO-CARRYING SYSTEM, AND SYSTEMS FOR LOADING THE CARGO-CARRYING SYSTEM

PRIORITY CLAIM

This Utility patent application claims the benefit of U.S. Provisional Application No. 63/804,887, filed May 13, 2025, entitled "CARGO-CARRYING SYSTEMS, METHODS OF LOADING A CARGO-CARRYING SYSTEM, AND SYSTEMS FOR LOADING THE CARGO-CARRYING SYSTEM", U.S. Provisional Application No. 63/798,993, filed May 2, 2025, entitled "CARGO-CARRYING SYSTEMS, METHODS OF LOADING A CARGO-CARRYING SYSTEM, AND SYSTEMS FOR LOADING THE CARGO-CARRYING SYSTEM", and U.S. Provisional Application No. 63/796,521, filed Apr. 29, 2025, entitled "CARGO-CARRYING SYSTEMS, METHODS OF LOADING A CARGO-CARRYING SYSTEM, AND SYSTEMS FOR LOADING THE CARGO-CARRYING SYSTEM", the entire disclosures of which are incorporated herein by reference in their entirely for all purposes.

FIELD

The following relates to cargo-carrying systems, methods of loading and unloading cargo-carrying systems, systems for loading and unloading the cargo-carrying systems, and methods of transporting cargo using cargo-carrying systems, with examples of the cargo-carrying systems being incorporated into a cargo transport trailer, a railcar, or another cargo vessel.

BACKGROUND

Today's cargo transport systems use trucks and railroads to move cargo by land, cargo planes to transport by air, and ships to transport by water. Some transport routes use more than one of these transport modes and may move cargo using an intramodal cargo container that may be carried by a truck, a railcar, or a ship. These systems are highly refined in terms of equipment, routes, application of relevant routing and tracking technologies, and automated or manual movement of goods during loading and unloading. The cargo transport industry operates with high levels of efficiency and cost-effectiveness, including with cargo tracking and handling systems and cargo transfer systems that efficiently transfer (trans-load) freight between different transport modes.

Notwithstanding the significant efficiencies gained from decades of refinements of automation, advances in highly sophisticated and specialized tracking and cargo handling technologies, and constantly-improving equipment for handling and loading and transporting cargo, today's systems include inefficiencies that have the capacity to be improved using sufficient ingenuity.

Shipping freight from one place to another can oftentimes involve multiple legs of a complete route, with different legs using a different transport mode. A first leg or "first mile" from an origin may be performed by truck. A next leg may also be performed by truck or may instead be performed by sea, rail, or air. A final leg is typically performed by truck.

Commonly, a first-mile and a last-mile may be less efficient and, therefore, more costly compared to intermediate legs. First-mile and last-mile transport legs are very often performed by truck because of the high level of flexibility in terms of scheduling and access to facilities. A trailer moved by a truck can directly access a commercial facility such as a factory, warehouse, or shipping hub, etc., by backing an end-door of the trailer to a loading dock. The trailer is positioned with the end-door engaged with a loading dock door and cargo can be loaded or un-loading through the end door manually or using light equipment such as a forklift or dolly.

Disadvantages of this system include that loading and unloading steps involve significant manual movement of cargo, typically as individual pieces or as pallets, onto or from the semitrailer. Moving cargo pieces or pallets individually onto or from a trailer interior can be both time-consuming and labor intensive.

Further, loading or unloading cargo onto or from a semitrailer using a loading dock will normally include a series of additional steps to arrange and schedule the loading or unloading; this is because the cargo is moved directly from or into the semitrailer as individual pieces, e.g., pallets or pieces of cargo; the semitrailer must be at the facility, then situated at the dock, and personnel and equipment must be available to perform the loading or unloading. The entire series of steps involves a significant need for time and coordination of assets, personnel, and other involved transport assets and cargo. At a large warehouse or factory-type facility, these can involve scheduling the arrival of a semitruck and trailer; scheduling or waiting to position the trailer at a loading dock door; positioning, adjusting, and securing the position of the trailer at a dock door; and a labor-intensive loading or unloading process.

SUMMARY

This description relates to cargo-carrying systems that include one or more removable cargo-carrying decks (referred to as "removable cargo decks," "removable decks," "decks," or alternately as a "shelf," "removable shelf," or the like), loading systems useful to load and unload removable decks onto and from the cargo-carrying system, methods of loading decks and cargo onto the cargo-carrying system, methods of unloading decks and cargo from the cargo-carrying system, and methods of using a removable deck or a cargo-carrying system to transport cargo supported by the removable deck from one location (e.g., an origin) to a second location (e.g., a destination).

The removable decks can be separated from a cargo transport vessel ("cargo vessel" or "vessel," herein) and cargo can be placed onto the removable deck separate from the vessel; the deck with cargo ("laden deck") can then be loaded onto a vessel. Example decks can be used interchangeably with different cargo vessels of the same type (e.g., with different bottom-loading trailers) and can be considered to be "inter-vessel" removable decks. The decks can be used interchangeably with different types of cargo vessels used in different transport modes (e.g., with either a truck or a railcar) and in this respect can be considered to be "intermodal" decks.

By example methods, a removable deck and its cargo (a "laden deck") may be: loaded into a cargo transport vessel; transported over one or multiple transport legs; may optionally be transloaded between different transportation modes (e.g., train, truck, or rail) for different legs; may be transported over an entire single leg or multi-leg route from an origin to a destination; and at the destination may be unloaded from a cargo transport vessel; all without removing the cargo from the removable deck.

According to certain example methods, cargo may be loaded onto a removable deck and the laden deck may be loaded into a bottom-loading cargo transport vessel as described, such as a bottom-loading trailer. The laden deck can be carried from the origin, over one or multiple transport legs, and with optional transloading of the laden deck between transport modes; at a transloading station the laden deck may be removed (unloaded) from a cargo transport vessel and loaded into a different cargo transport vessel of the same transportation mode or a different transportation mode without removing the cargo from the removable deck. The laden deck arrives a destination and the laden deck is removed from the cargo transport vessel.

By these and other example methods cargo can be placed onto a removable deck while the removable deck is separated from a cargo transport vessel, at an origin (e.g., at a warehouse, factory, trucking hub, railyard). At the origin, the laden deck can be loaded (e.g., bottom-loaded) into a cargo transport vessel. The laden deck can be transported to a destination using the cargo transport vessel and optionally one or more additional cargo transport vessels by transloading the laden deck from one cargo transport vessel to a second cargo transport vessel without removing the cargo from the removable deck. At the destination (e.g., warehouse or factory or trucking hub or railyard) the laden deck can be unloaded from a cargo transport vessel with its original cargo. After the laden deck is unloaded from and separated from the cargo transport vessel the cargo can be removed from the removable deck.

An example cargo transport vessel includes a cargo-carrying system that includes a frame and a removable deck that is adapted to be supported by the frame by one or more deck holders adapted to support the removable deck within the frame. The frame includes a bottom opening and the removable deck is adapted to pass through the bottom opening into the frame and to be supported by the frame using the one or more deck holders.

This or other example cargo-carrying systems may include multiple frame supports that include one or more vertical frame supports (or "vertical supports") that define a frame space within (between) the frame supports; one or multiple removable decks adapted to be supported within the frame space; and a deck holder, e.g., multiple deck holders, that are adapted to engage both a deck and a frame support to hold (support) the removable deck at a desired position within the frame space during transport of the frame and the deck.

An example frame may include a frame top and a frame bottom separated by vertical frame supports. A frame bottom may include a bottom opening that allows a removable deck to be moved into the frame space through the bottom opening from a position outside of the frame space, i.e., below the frame; these frames may be referred to as "bottom-loading" frames.

Some example versions of cargo-carrying systems include a frame that is incorporated into a cargo transport trailer ("trailer" for short), and one or multiple removable decks adapted to be loaded into and unloaded from the frame and supported by the frame; these trailers may be referred to as "bottom-loading" trailers. These bottom-loading trailers may be used with loading systems that include a loading platform that can be positioned during use in a loading platform space located below the bottom-loading trailer and below the frame. The loading platform can be moved vertically (elevated and lowered) from a position in the loading platform space (below the trailer) to a position within the frame (e.g., in the frame space) by the loading platform passing through the bottom opening of the frame. The loading platform can support a removable deck placed onto the loading platform within the loading platform space, and can be vertically moved and positioned within a frame space above the loading platform space to different locations within the frame space to move, support, and position the removable deck within the frame space.

Optionally, an exemplary loading platform may also be adapted to move a removable deck horizontally within a frame space or within a loading platform space. An exemplary loading platform may be adapted to both i) support a removable deck and move the removable deck vertically within the frame space, and ii) move the removable deck horizontally within the frame space, e.g., in a direction of a length of the removable deck and the frame space.

According to example methods of loading a removable deck onto a frame, the removable deck (with cargo supported on the deck) can be initially supported on the loading platform at a loading position below the frame space. Independently, the frame can be brought into position on a loading deck (a.k.a. "transport deck") that is part of a loading station that also includes the loading platform space and loading platform positioned below the loading deck. The loading deck may be any surface adapted to support a truck, trailer, railcar, or other cargo transport vessel moving over the deck, and may be made of concrete, asphalt, rails, or a similar surface adapted to support a trailer, truck, railcar, etc., at a position above the loading platform space.

The cargo transport vessel that includes the frame is supported on the loading deck with the frame and the bottom opening of the frame being positioned above the loading platform space and the loading platform, which are located in an opening ("pit," or "well") in the loading deck that extends vertically down to a level below the loading deck. The loading platform in the loading platform space can be used to support the removable deck and to move the removable deck vertically through the bottom opening, into the frame space, and to a position of (at or approximately at) a deck-holding height within the frame space. The removable deck positioned as desired within the frame space is then supported within the frame space at a deck-holding height using deck holder (e.g., using multiple deck holders). With the removable deck being supported by the deck holder, the support for the removable deck that has been provided by the loading platform is removed; the weight of the removable deck is transferred from the loading platform to deck holders supported by the frame. For example, the loading platform can be lowered vertically to a height that is below the position of the removable deck being supported by the deck holder to allow the weight of the removable deck to be transferred from the loading platform to the deck holder. The weight of the deck and the cargo on the deck is transferred from the loading platform to the deck holder, which is engaged with and supported by the frame, e.g., vertical supports of the frame.

With the deck positioned and supported by the deck holder within the frame space, the loading platform can be lowered into the loading platform space. Optionally, a second removable deck can be positioned onto the loading platform in the loading platform space and then elevated into the frame space through the bottom opening by these same steps, and supported within the frame space at a second deck-holding height that is lower than (vertically below) the height of the previously-loaded deck. Still additional (e.g., third, fourth, etc.) removable decks may optionally be loaded into the frame space by these same steps, each at a deck-holding height that is lower than the previous deck-holding height. Multiple removable decks, each with cargo supported thereon, can be loaded onto the frame, including a bottom removable deck that is loaded and then supported by deck holders at the bottom of the frame, e.g., less than 2, 1, 0.5, or 0.2 feet above the frame bottom, to cover the bottom opening and optionally to enclose the frame space at the bottom opening.

After loading a final and lowermost removable deck onto the frame, the loading platform may be removed from the frame space by lowering the loading platform through the bottom opening and into the loading platform space. The cargo transport vessel (e.g., trailer) that includes the frame, and decks (loaded with cargo) supported by the frame may then be moved from the loading station and transported to a destination. With an example cargo transport vessel being a semitrailer, a prime mover may be a truck, and the trailer may be moved "over-the-road," from the loading station ("origin") to a second location (i.e., a "destination") at which the removable decks and cargo are unloaded from the frame. According to certain example methods, the trailer and frame laden with one or more laden decks can be moved by a commercial, over-the-road truck transport method from the location of loading one or more laden decks onto the frame (a "loading station" or "origin") to a second location ("destination") at which the cargo is to be received and the laden deck can be removed from the frame. A removable deck that is loaded with cargo can be referred to as a "laden" deck and a frame or trailer that is loaded with one or more laden decks may be referred to as a "laden" frame or a "laden" trailer.

A destination may be a location of a railyard, trucking hub, a cargo handing facility, a trans-loading facility, or any other location at which cargo is to be removed from a cargo transport vessel for use or further transport. The laden decks are unloaded from the frame by a sequence that is the reverse of a loading sequence used to load the decks onto the frame. Once a laden deck is removed from the frame and vessel, the laden deck may be loaded onto another bottom-loading trailer or may be loaded onto a railcar or other cargo vessel; or the cargo of the laden deck may be removed from the deck, at the destination. After unloading the laden decks from the frame, the frame can be loaded (re-loaded) with laden decks, which may be the same decks that were previously removed from the laden frame but carrying new cargo, or may be individual laden decks that are different from the individual decks previously removed from the laden frame.

According to example methods of unloading a laden deck from a frame, the cargo transport vessel (e.g., trailer) and frame can be positioned on a loading deck (transport deck) vertically above a loading platform space. The loading platform can then be moved vertically between the loading platform space and the frame space to unload one or more decks from the frame. The loading platform is moved vertically, through the bottom opening of the frame, and is placed under a laden deck that is supported by the frame, e.g., in the frame space of the frame. The loading platform is placed beneath the laden deck, the support provided by one or more deck holders to hold the deck in place and support the deck is removed, and the weight of the laden deck is transferred to and supported by the loading platform. Optionally, the loading platform may be used to move the laden deck horizontally relative to the frame, e.g., within the frame space. The laden deck is lowered from through the bottom opening of the frame into the loading platform space below the frame.

A second, third, or fourth, etc., laden deck if present can be unloaded from the frame by these unloading steps repeated for each additional deck held in the frame space. According to example steps, a first deck removed from a frame space may be a deck located at a bottom of a frame at a lowermost deck-holding height. A deck located in the frame space at a deck-holding height that is above the deck-holding height of the first-removed deck may be removed next. Multiple decks in the frame space may be removed in an order of a lowermost deck held within the frame space being removed first, followed by a next-lowermost deck held within the frame space being removed next, until a final deck at a highest deck-holding height in the frame space is removed last.

The frame, after all laden decks are removed, may be loaded again with a second set of laden decks, i.e., the frame may be re-loaded with individual removable decks (each being pre-loaded with cargo) that are the same as or that are different from the individual removable decks that were removed from the frame.

In one aspect, the disclosure relates to method of loading cargo to a trailer. The trailer includes a front end; an aft end; and a cargo-carrying system that includes a frame having a frame bottom with a bottom opening in the frame bottom, and a removable deck adapted to be supported by the frame. The method includes moving the trailer over a transport deck to position the frame above a loading platform space, supporting the removable deck on a loading platform positioned in the loading platform space, with cargo supported by the removable deck, and elevating the loading platform, the removable deck, and the cargo, through the bottom opening.

In another aspect, the disclosure relates to a method of loading a removable deck to a bottom-loading cargo transport vessel. The method includes: in a loading platform space below the vessel, supporting the removable deck on a loading platform with cargo supported by the removable deck, and elevating the loading platform, the removable deck, and the cargo, into a bottom-loading cargo vessel.

In another aspect, the invention relates to a method of loading cargo to a bottom-loading cargo transport vessel from a loading space below the vessel. The vessel includes: a front end, an aft end, and a cargo-carrying system comprising a frame comprising vertical supports, frame space between the vertical supports, a frame top, a frame bottom, and a bottom opening in the frame bottom, and a removable deck adapted to be supported within the frame space. The method includes: moving the vessel over a transport deck to position the frame above a loading platform space, supporting the removable deck on a loading platform positioned in the loading platform space, with cargo supported by the removable deck, and elevating the loading platform, the removable deck, and the cargo, through the bottom opening and into the frame space.

In another aspect, the disclosure relates to a method of loading a first removable deck and a second removable deck onto a cargo-carrying system. The cargo-carrying system includes: a frame comprising vertical supports, a frame top, and a frame bottom having a bottom opening, frame space between the vertical supports, a first removable deck adapted to be supported within the frame space, and a second removable deck adapted to be supported within the frame space. The method includes: supporting the first removable deck on a loading platform below the frame space, moving the first removable deck vertically from below the frame space, through the bottom opening, into the frame space, and supporting the first removable deck within the frame space at a first deck-holding height, with the first removable deck supported at the first deck-holding height, moving the loading platform vertically to a position below the frame space, supporting the second removable deck on the loading platform positioned below the frame space, and with the first removable deck supported at the first deck-holding height, moving the second removable deck vertically from below the frame space, through the bottom opening, into the frame space, and supporting the second removable deck within the frame space at a second deck-holding height that is below the first deck-holding height.

In another aspect, the disclosure relates to a method that includes: supporting a removable deck on a loading platform positioned below a frame space of a frame, the frame space defined by frame supports, a frame top, and a frame bottom that includes a bottom opening; moving the removable deck vertically through the bottom opening to a position inside of the frame space; supporting the removable deck in the frame space with deck holders engaging the removable deck and the frame supports, and removing the loading platform from the frame space.

In another aspect, the disclosure relates to a trailer that includes: a front end; an aft end; a trailer body that is supported by the front end and the aft end, and a cargo-carrying system. The system includes: a frame comprising vertical supports, frame space between the vertical supports, a frame top, a frame bottom, and a bottom opening in the frame bottom; a removable deck adapted to be supported within the frame space, and deck holders adapted to engage the removable deck and the vertical frame to support the removable deck within the frame space.

In another aspect, the disclosure relates to a loading system for loading a removable deck onto a frame of a cargo-carrying system. The cargo-carrying system includes a frame comprising frame supports, a frame top, a frame bottom that includes a bottom opening, and a frame space between the vertical supports; and a removable deck adapted to be supported within the frame space. The loading system includes a loading platform that is adapted to supporting the removable deck and to move the removable deck vertically from a loading platform space below the frame space, through the bottom opening, and into the frame space.

In another aspect, the disclosure relates to a bottom-loading cargo transport vessel that includes: a front end, an aft end, a body supported by the front end and the aft end, and a cargo-carrying system. The system includes: a frame comprising vertical supports, frame space between the vertical supports, a frame top, a frame bottom, and a bottom opening in the frame bottom; a removable deck adapted to be supported within the frame space; and deck holders adapted to engage the removable deck and the vertical frame to support the removable deck within the frame space.

Figure 1A:
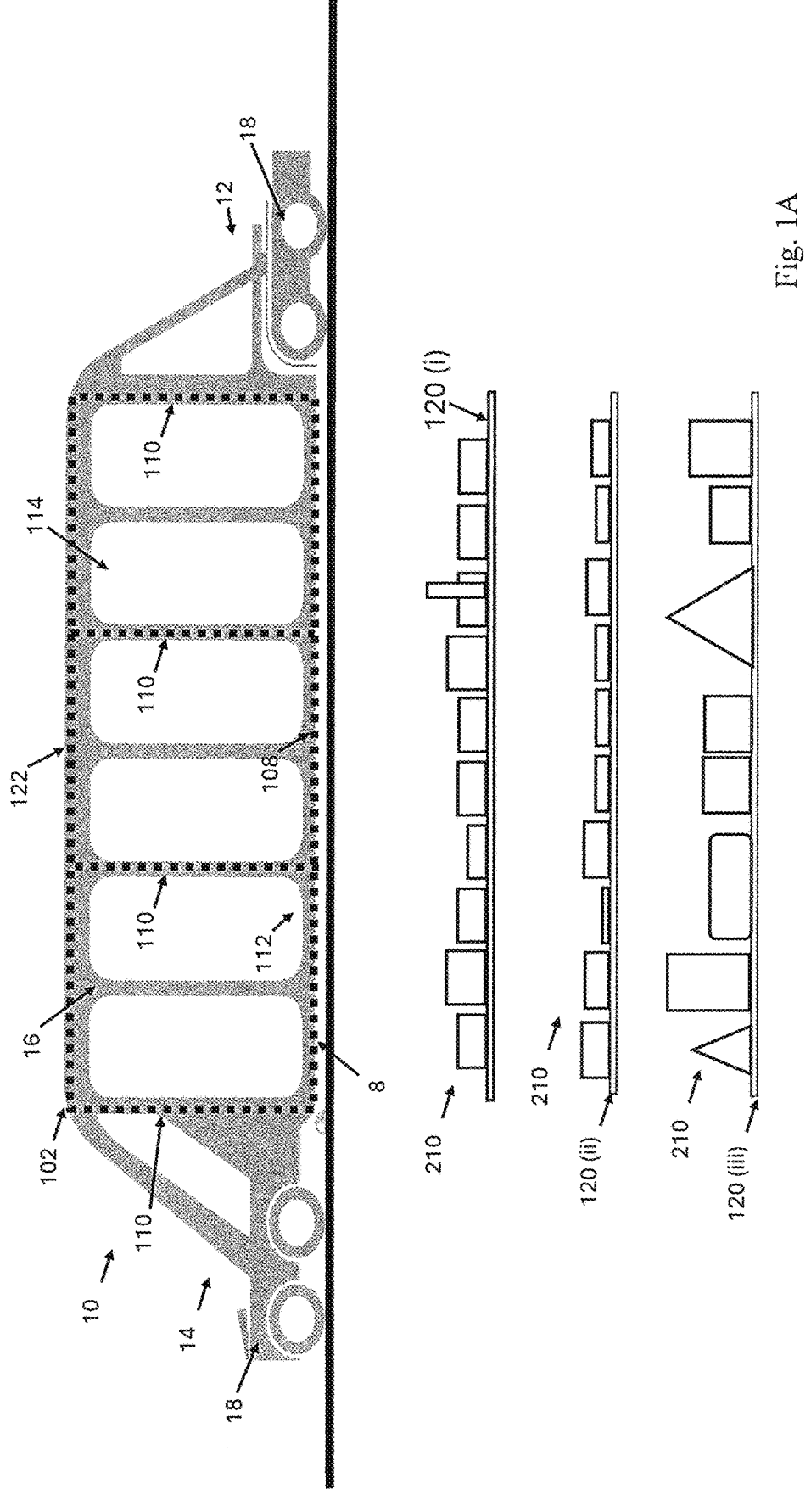
FIGS. 1A, 1B, 1C, 1D, 1E, 1F, 1G, 1H, 1I, 1J, 1K, 1L, and 1M are side views of example bottom-loading trailers and cargo-carrying systems as described.

The drawings are for purposes of example only, are schematic, and are not necessarily to scale. Identification numbers are used throughout the figures and description to identify similar described features and structures.

DETAILED DESCRIPTION

Described are cargo transport vessels, e.g., trailers, railcars, cargo containers, and the like, that include a cargo-carrying system incorporated into the cargo transport vessel. The cargo transport vessel includes a frame, one or more removable decks that are adapted to be supported by the frame, and an open bottom of the frame through which the one or more removable decks can be passed to be loaded onto the frame. Such a frame and such a vessel that includes the frame and one or more removable decks can be referred to as a "bottom-loading" frame or vessel.

Herein, much of the description is directed toward bottom-loading cargo transport vessels that are specifically bottom-loading trailers; however, this description can be similarly applied to other bottom-loading cargo transport vessels that include a bottom-loading frame as described, such as a bottom-loading railcar, a bottom-loading cargo container, etc.

With respect to a bottom-loading trailer, a cargo-carrying system that is incorporated into the bottom loading trailer includes a frame that is supported by the trailer. An example frame includes frame supports (e.g., "vertical supports" or "vertical frame supports") and an interior or "frame space" that is located within the frame between frame supports. The frame includes a frame bottom that includes a bottom opening that allows a removable deck to be moved into and out of the frame space through the frame bottom.

The cargo-carrying system incorporated into a bottom-loading cargo transport vessel (e.g., a trailer) also includes one or more removable decks, each of which is adapted to be loaded into the frame through the bottom of the frame and to be supported by the frame space. Example removable decks may be inter-vessel decks, which can be interchangeably loaded into different individual cargo transport vessels. These and other example removable decks may be intermodal decks, which can be loaded into different types of cargo transport vessels such as either a railcar or a semitrailer.

The cargo-carrying system also includes one or more deck holders that are adapted to support the one or more removable decks on the frame, for example within a frame space of the frame.

Example frames may include vertical structures referred to as "frame supports," or "vertical frame supports," or "vertical supports" that function as a rigid, weight-bearing support structure for the frame at the periphery of the frame, and to support one or more removable decks. Examples of vertical supports may be in the form of a vertical (upright or angled) post, a horizontal beam, plate, brace, or wall enclosure made of a rigid material such as metal (steel), polymer (plastic), a composite material such as a carbon fiber material, or combinations of these.

The frame is supported by the trailer (or other cargo transport vessel) and can be incorporated into the structure of the trailer. The trailer can include components referred to as a trailer body (or "chassis") that is supported by and that connects to two ends of the trailer, which may be referred to as a front (or forward) end and an aft (or rear or back) end, or the like. The trailer body, trailer front end, trailer aft end, or two or more of these may be integrated into and combined with the structure of the frame. The front end may be attached to a prime mover to move the trailer. The aft end may optionally be attached to a front end of a second trailer, which also includes a cargo-carrying system as described.

An example frame, not including structure of a trailer or other vessel that supports the frame, can generally have a three-dimensional rectangular form with four vertical frame sides (two lengthwise sides and two ends), a horizontally-extending frame bottom that includes a bottom opening, and a horizontally-extending frame top. Optionally one or more of the frame sides and frame ends can be covered, such as by structure of the frame or structure of a body of the trailer, to protect and secure the contents of the trailer and the frame. The frame may be enclosed on four sides and a top with permanent rigid and high-strength structures that extend over an entire area (height, and length or width) of the frame sides, ends, and top. The structures may be made of a high strength material such as a metal or reinforced composite (e.g., carbon fiber, fiberglass, etc.) sheet or plate material to provide structural support for the frame or to provide a cover, closure, or high strength security barrier that encloses and protects contents within the frame space.

Figure 1B:
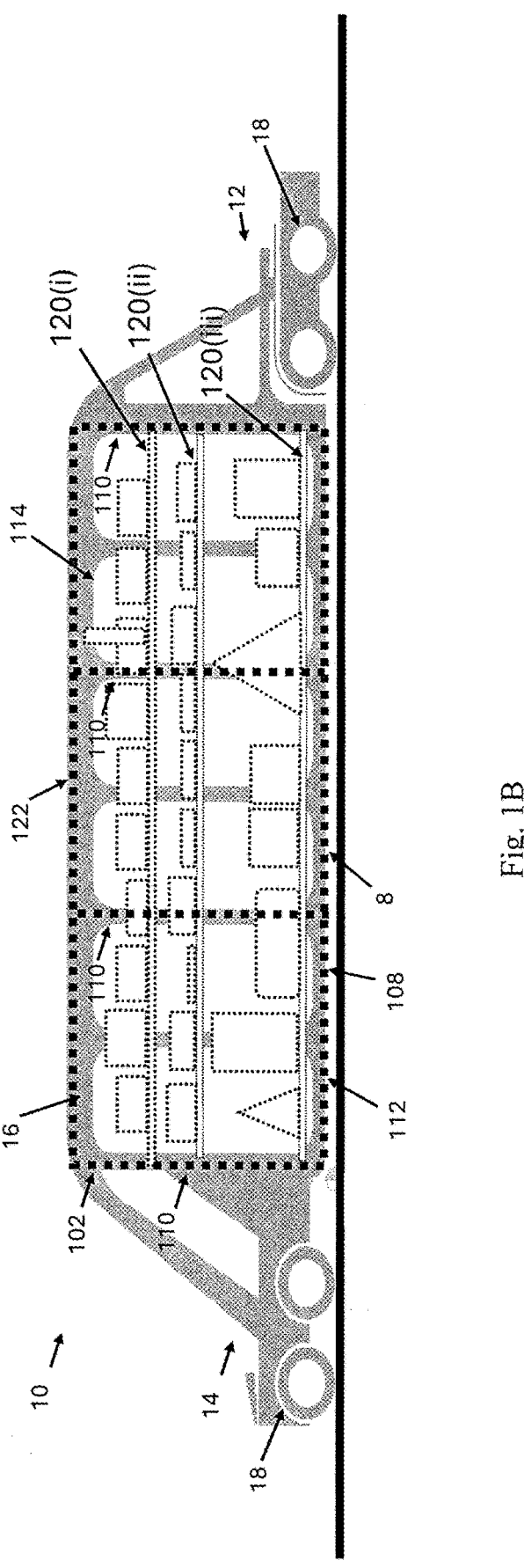
Figure 1C:
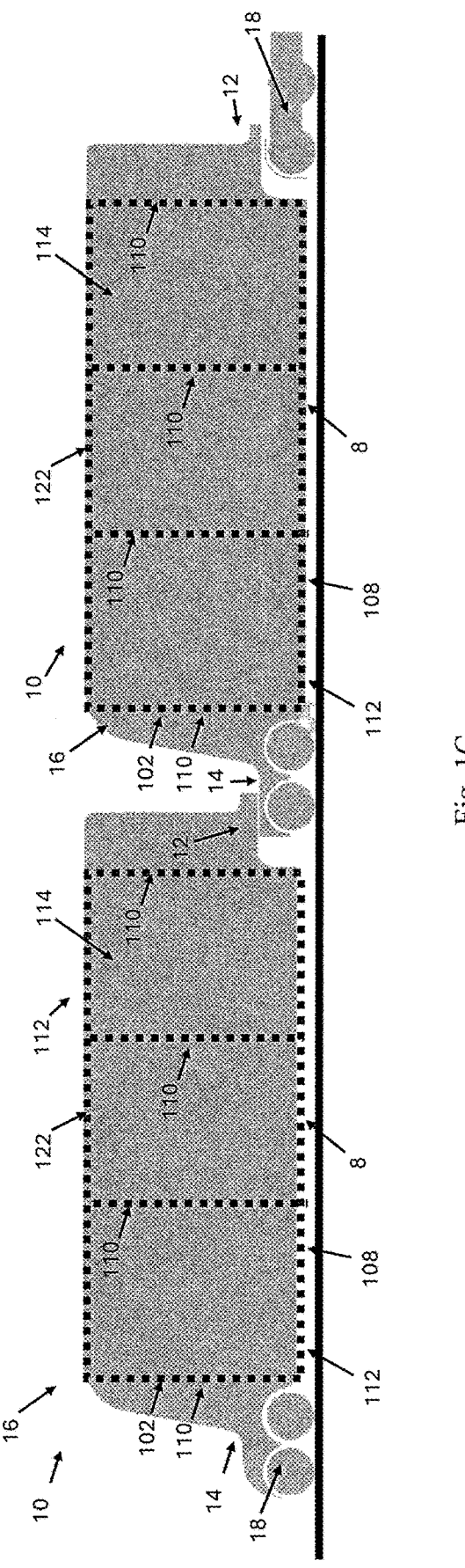
Figure 1D:
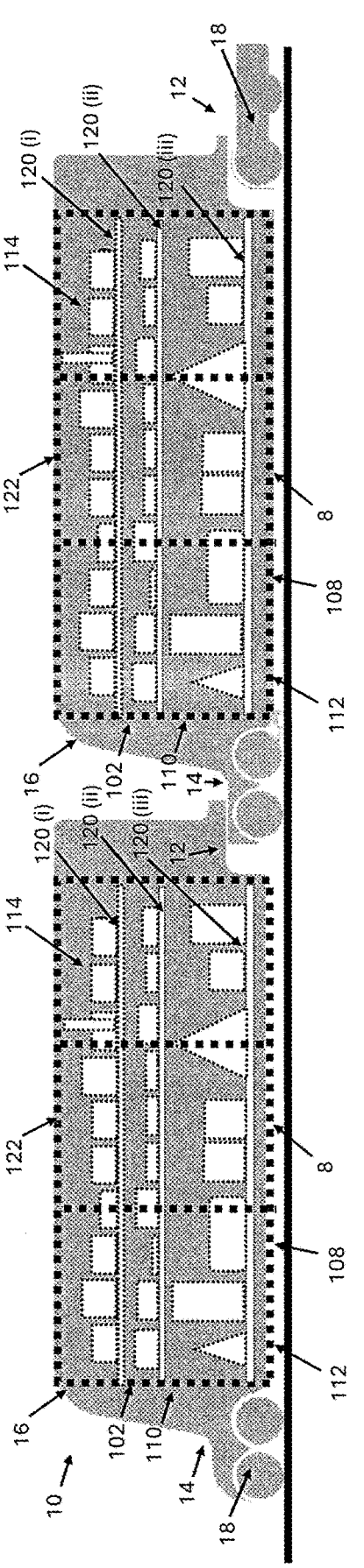
Figures 1E, 1F:
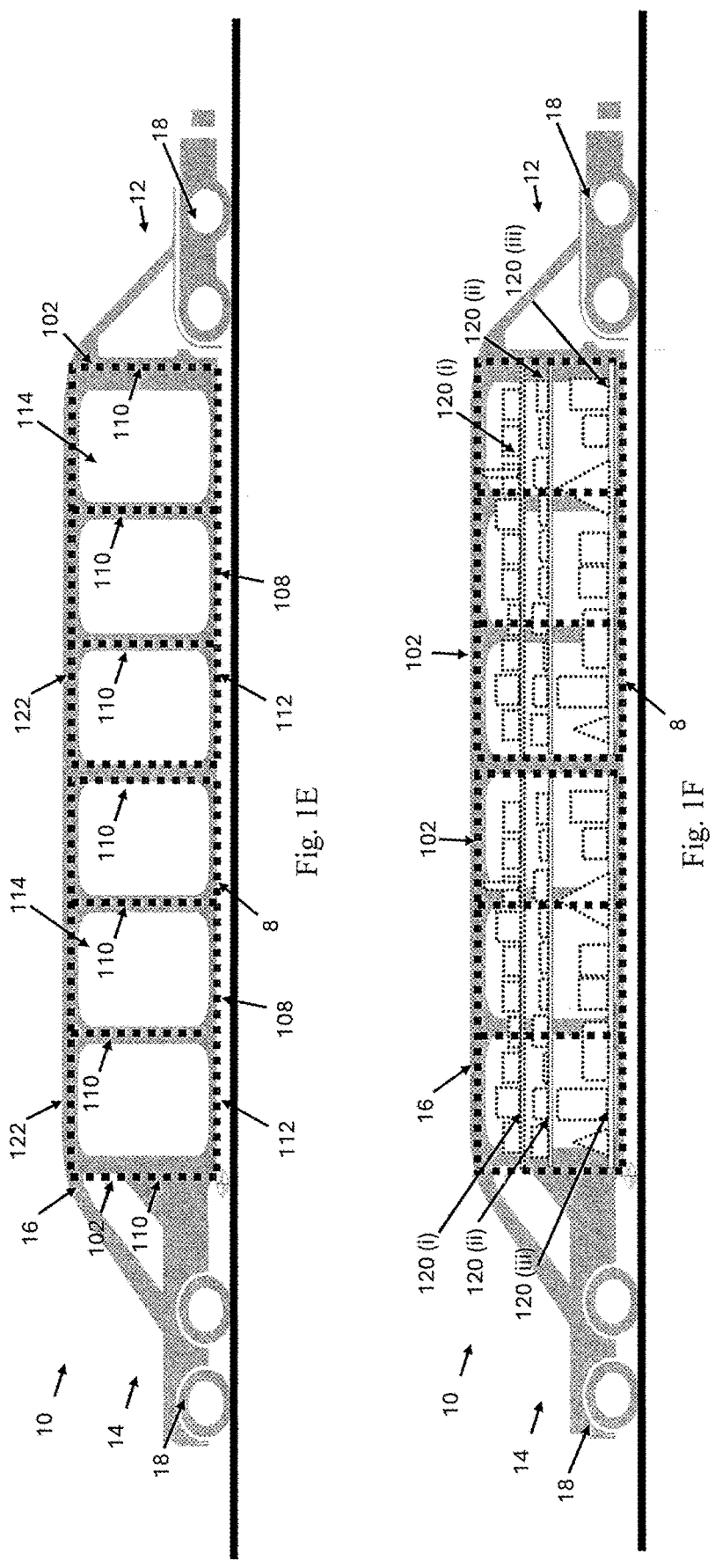
Figure 1G:
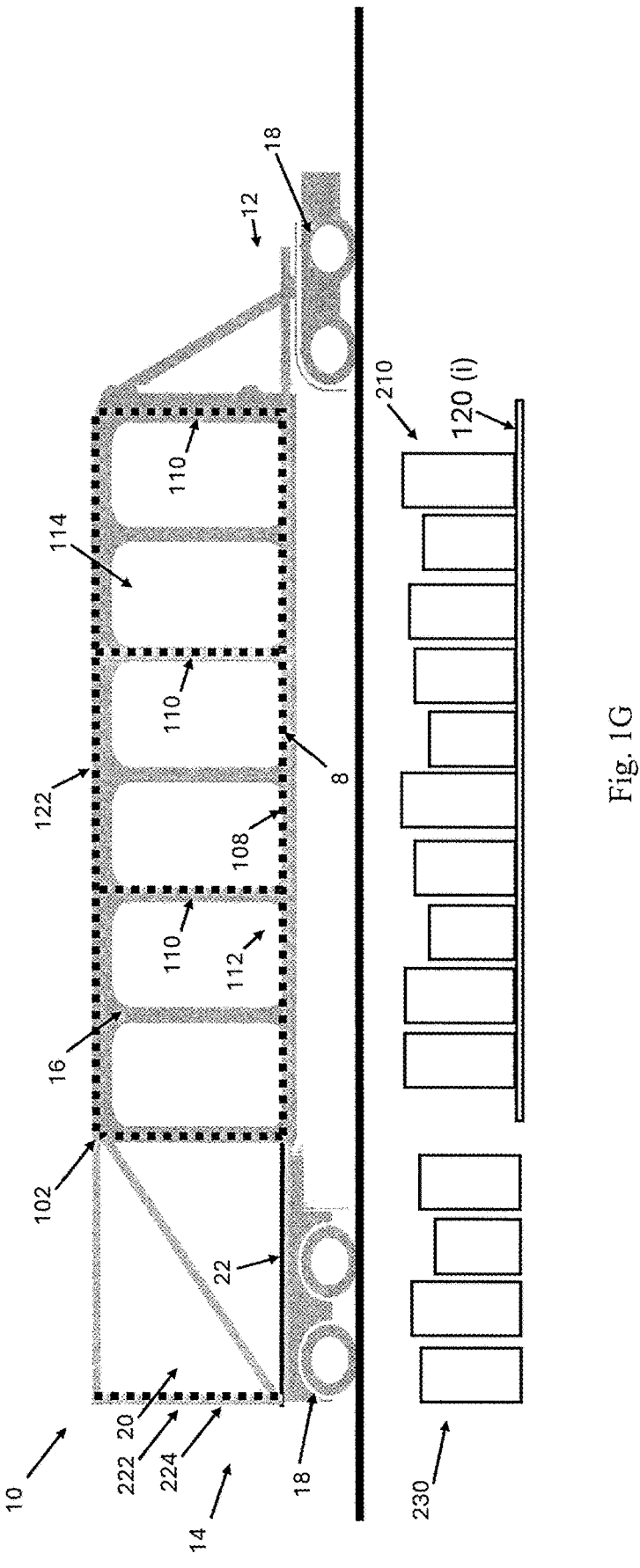
Figure 1H:
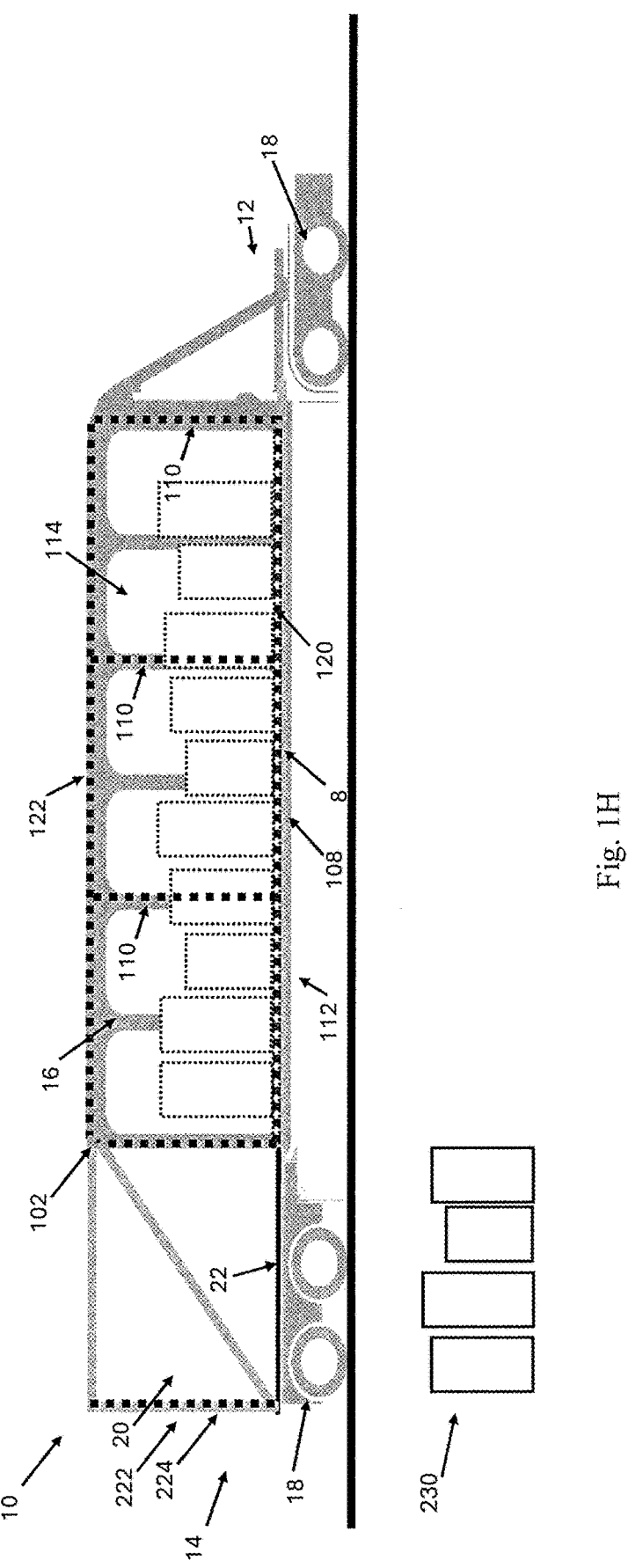
Figure 1I:
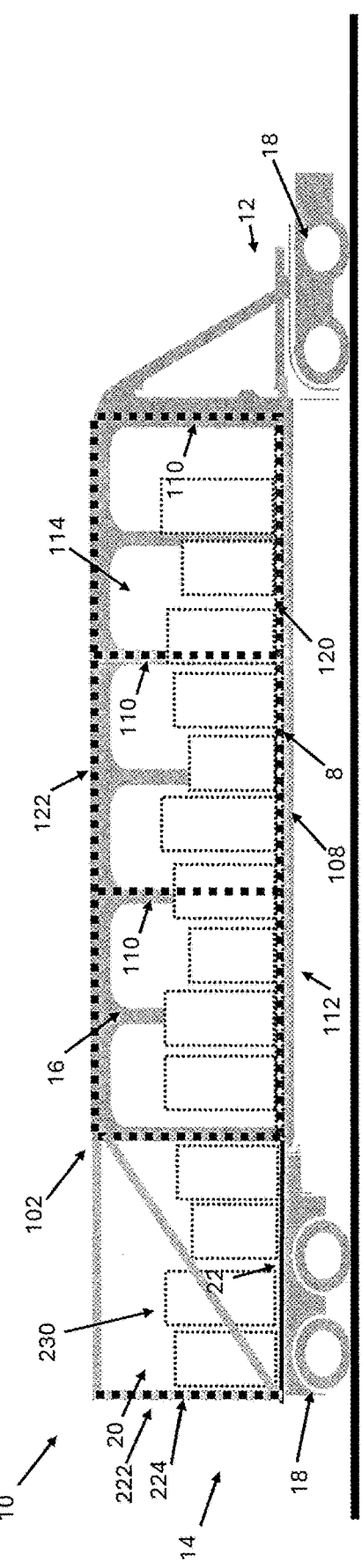
Figure 1J:
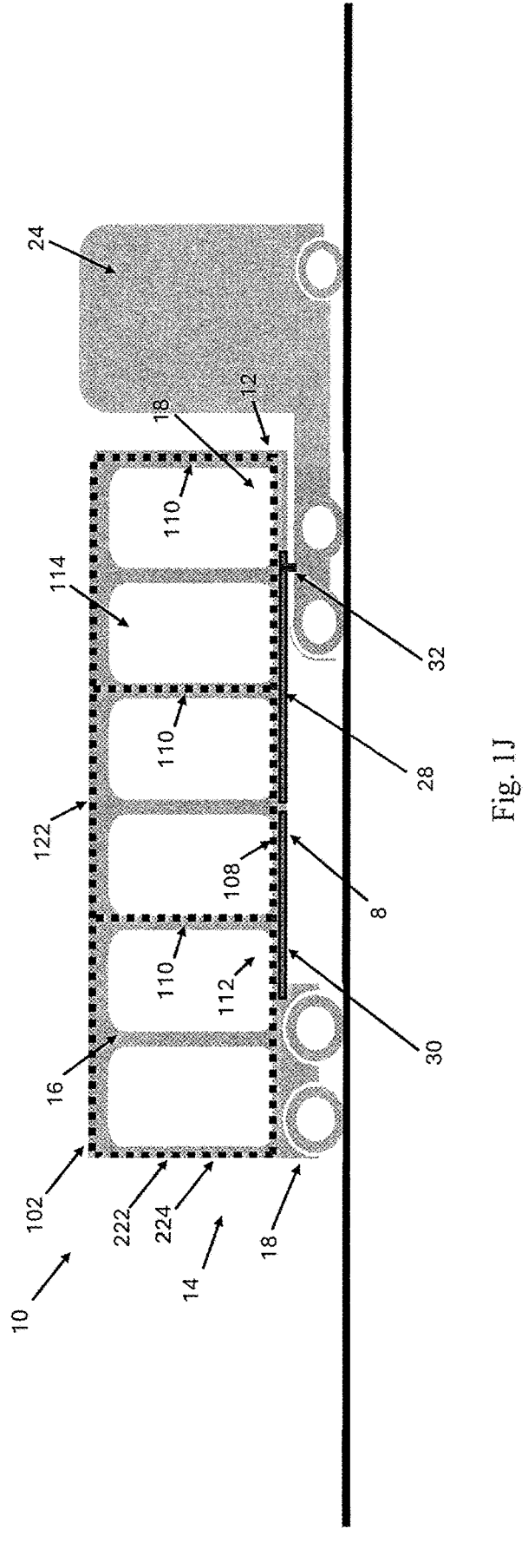
Figure 1K:
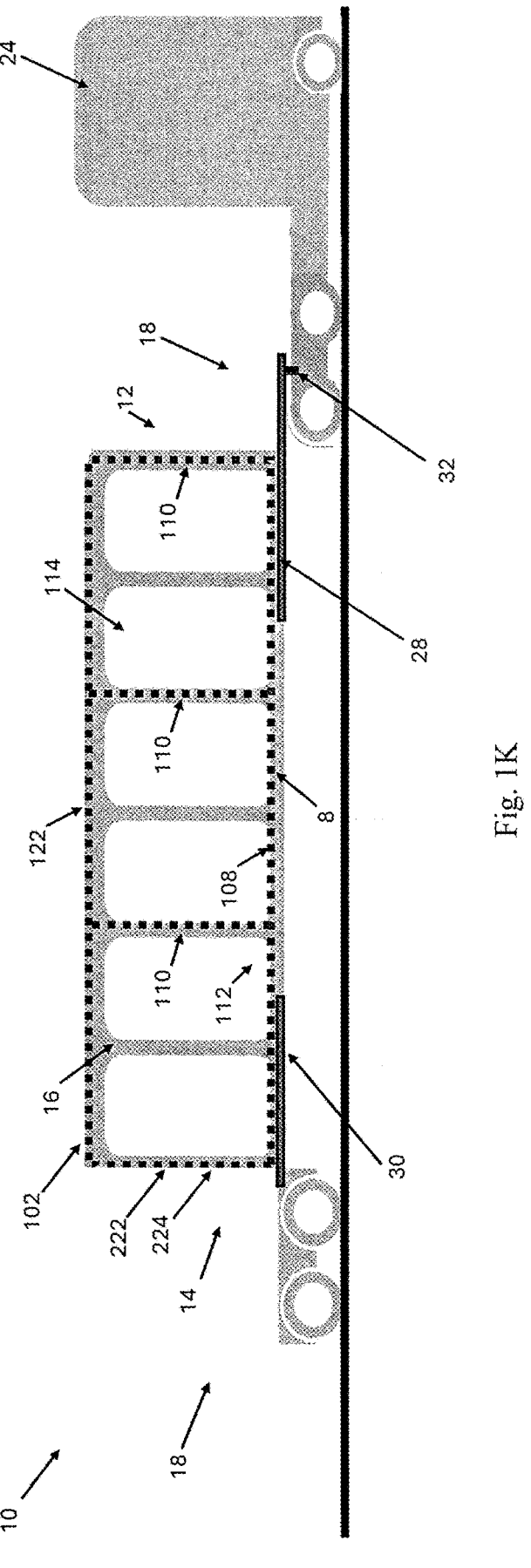
Figure 1L:
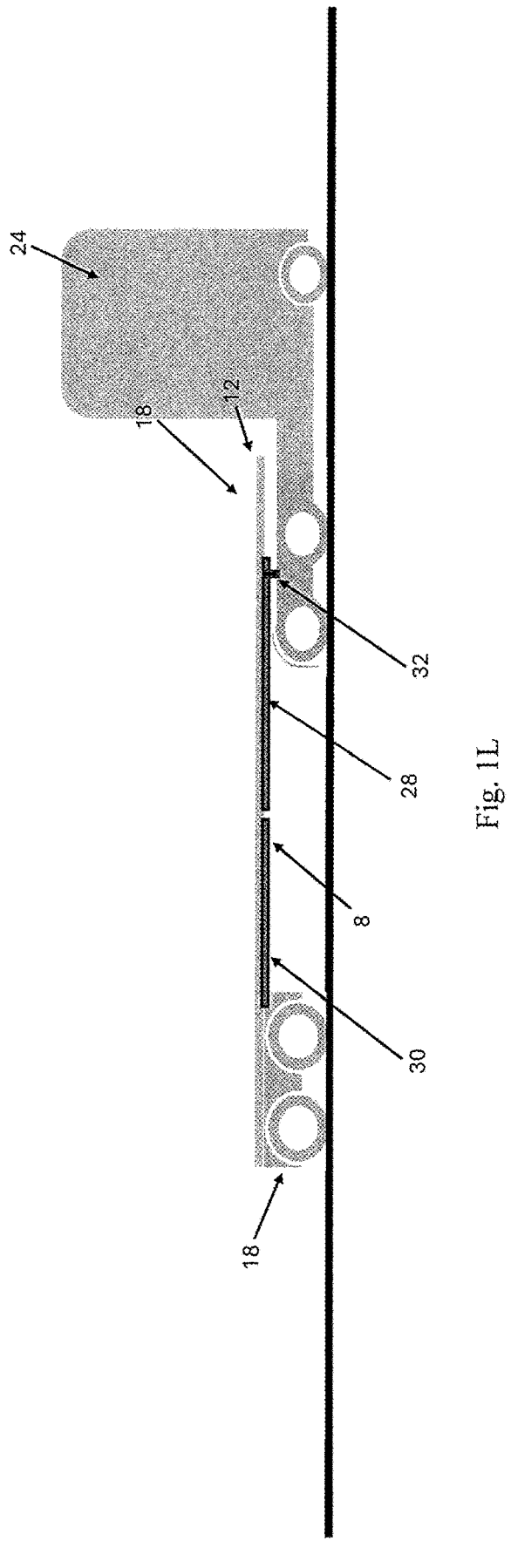
Figure 1M:
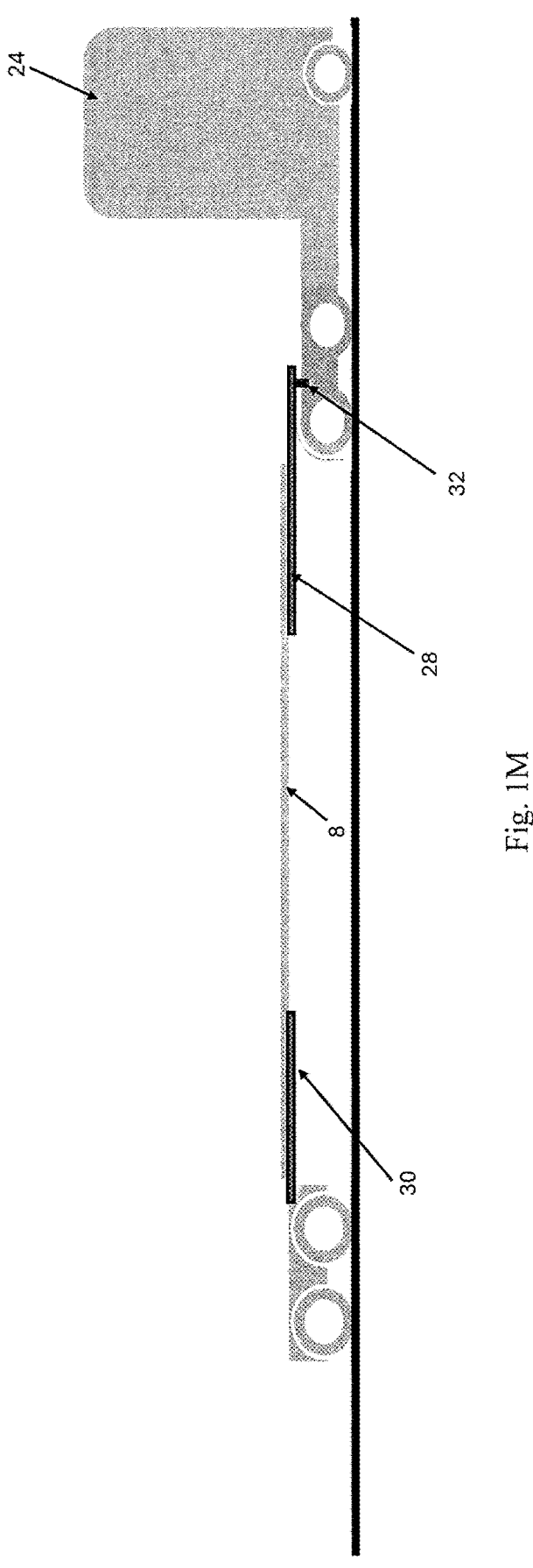

According to other examples, a frame may include a single horizontally-extending frame structure having both a frame bottom and a frame top, with no separate vertically-extending frame supports (see FIGS. 1L and 1M). This example frame is open vertically through the frame structure, including through the frame bottom and the frame top, to allow a removable deck to be loaded through open frame bottom and frame structure from below and to be supported by deck holders attached to the frame and to the removable deck as described.

As described and illustrated, an example frame may be incorporated into a trailer that is adapted to be transported over-the-road and is supported at a front end and at an aft end by wheels and one or more axles. An example trailer body, like the frame supported by the trailer body, has an open bottom that allows access and movement of a removable deck vertically through the frame, e.g., between a frame space and a space below the frame space, to allow one or more removable decks to be loaded and unloaded to the frame through the bottom opening of the frame and the bottom opening of the trailer body.

The trailer may be adapted to be transported between two locations using a "prime mover," which refers to any motorized unit that is adapted to attach to the trailer and move the trailer over a transport deck (e.g. road). A prime mover may be, for example: a gasoline or diesel-powered tractor or "truck" such as a semi-tractor; an electrically-powered programmable robot; an electrically-powered autonomous driving or tractor device such as a self-driving electric semi-tractor cab, or any other type of powered device that can attach to the trailer and move the trailer.

According example systems, a frame may be incorporated into a movable cargo transport vessel, e.g., a trailer, that is supported at a front end and at an aft end by axles and wheels attached to the axles, and that can be moved over a transport deck (e.g., rails or a road deck) between an origin (e.g., where the trailer is loaded with removable decks and cargo) and a destination (where the removable decks and cargo are unloaded from the trailer).

A removable deck and a frame of a cargo-carrying system as described may be of any useful dimensions, and can be adapted to be useful to hold, store, contain, handle, support, move, and transport cargo of very high mass. A frame may be sized to allow one or two individual frames to be supported by a trailer having a length that is within commercial size ranges. As non-limiting example dimensions, a frame may have a length in a range from 20 to 60 feet (e.g., from 20 to 57 feet or from 25 to 30 feet) and a height in a range from 10 to 15 feet above a transport deck. A removable deck may have length and width dimensions also within these ranges while potentially being slightly less than a length and width dimension of a frame used to contain the removable deck. Example lengths of removable decks may be from 23 to 30 feet, such as from 23 to 27 feet (e.g., about 25 feet) or from 27 to 30 feet (e.g., about 28 feet). Example widths of a frame and of a removable deck may be from 8 to 11 feet, such as about 8 feet or about 10 feet.

A single removable deck may be designed to support cargo of any size, various sizes, and various masses, including very heavy cargo. A single removable deck may support up to or greater than 10,000, 20,000, or 30,000 pounds of cargo when supported on a frame. A frame may support multiple removable decks, each removable deck holding cargo of up to or exceeding 10,000, 20,000, or 30,000 pounds, with a total weight of cargo on one or multiple (two, three, or four or more) removable decks supported and carried by a single frame being up to or in excess of 20,000, 50,000, or 80,000 pounds.

One or multiple trailers can be attached to a single prime mover according to various combinations. A trailer combination can be arranged as desired, with two or more trailers being attached and pulled by a single prime mover, with both trailers containing a cargo-carrying system as described. Two trailers may be coupled together either using a fifth wheel (a B coupling) or a bolt and pin coupling with a dolly (an A coupling). A basic example is a prime mover with a single trailer as described attached to the prime mover by a fifth wheel, i.e. a semitrailer configuration. Another example can be a prime mover with two semitrailers using a fifth wheel to attach the second trailer to the first trailer, referred to as a "B-train" or a "B-double." Another example may be a prime mover with more than two semitrailers, referred to as a "B-triple." An "A-double" is a semitrailer pulling another trailer using an A coupling.

A trailer, at a front or back, within the trailer body or outside of the trailer body, may include appurtenant operating or safety equipment such as a refrigerator unit or fire-suppression (e.g., inert gas) equipment.

FIG. 1A shows example trailer 10 that includes a cargo-carrying system that includes frame 102, removable decks 120 (schematically, outside of frame 102), and deck holders (not specifically shown). Decks 120 support cargo 210. Trailer 10 includes front end 12, aft end 14, and body 16 which connects front end 12 with aft end 14 and supports and optionally includes or incorporates frame 102, and which includes bottom opening 8 adapted to correspond to bottom opening 112 of frame 102. Frame 102 includes vertical supports 110 in the form of vertical posts (as illustrated), frame top 122, and frame bottom 108 (including bottom opening 112), which together define three-dimensional frame space 114 therebetween. Trailer front end 12 and trailer aft end 14 are supported by wheel sets 18, which include wheels and axles. Wheel sets 18 may be a wheel set attached to the trailer, typically at aft end 14 of the trailer. A wheel set 18 that supports trailer front end 12 may be a component of a prime mover as shown in FIG. 1A et al., showing examples of trailer 10, or a component of another trailer, see FIG. 1C.

At FIG. 1B, each one of decks 120, with cargo, has been loaded into frame 102 from below frame 102 by lifting each deck 120 vertically through bottom opening 112 of frame 102, then supporting each deck at a deck-holding height within frame 102. The first deck 120 loaded through bottom opening 112 is deck 120 (i), which is also supported at the highest level within frame space 114, meaning the highest deck-holding height. The second deck 120 loaded through bottom opening 112 is deck 120 (ii), which is supported below deck 120 (i) within frame space 114 at a second deck-holding height that is below the deck-holding height of deck 120 (i). The third deck 120 loaded through bottom opening 112 is deck 120 (iii), which is supported below deck 120 (ii) within frame space 114 at a third deck-holding height that is below the second deck-holding height of deck 120 (ii).

A trailer or other cargo transport vessel, a frame, and a removable deck may be of any useful length and width dimensions. A length of a deck and frame may be, for example, from 20 to 55 feet, e.g., approximately 20, 28, 30, 35, 40, 45, or 50 feet. "Approximately" means equal to or within 1 foot greater than or one foot less than; "approximately" with reference to a frame or deck having a length of 20 feet means a length in a range from 19 to 21 feet. A width of a deck and frame may be, for example, from 6 to 12 feet, e.g., approximately 8, 9, 10, 11, or 12 feet. "Approximately" equal to a width means equal to or within six inches greater than or six inches less than a width; for example, a width of "approximately" 10 feet means a width in a range from 9.5 to 10.5 feet.

FIGS. 1C and 1D show an example of two connected trailers 10 that form a B-trailer or B-train. Each of the two individual trailers 10 includes a cargo-carrying system that includes frame 102, removable decks 120 (see FIG. 1D), and deck holders (not specifically shown). Decks 120 support cargo 210. Each of the two trailers 10 includes front end 12, aft end 14, and body 16 which connects front end 12 with aft end 14 of each trailer and supports and optionally includes or incorporates frame 102 of each trailer. Each frame 102 includes vertical supports 110 in the form of vertical posts, frame top 122, and frame bottom 108 (including bottom opening 112) to define frame space 114 between vertical supports 110. Trailer front end 12 and trailer aft end 14 are supported by wheel sets 18, which include wheels and axles.

At FIG. 1D, each of decks 120, with cargo, is loaded into frame 102 of the two trailers 10 from below, through bottom opening 112 of frame 102. The first-loaded deck 120 (i) is supported at the highest level within frame space 114. The second-loaded deck 120 (ii) is supported below deck 120 (i) within frame space 114 at a second deck-holding height that is below the deck-holding height of deck 120 (i). The third-loaded deck 120 (iii) is supported below deck 120 (ii) within frame space 114 at a third deck-holding height that is below the second deck-holding height of deck 120 (ii).

FIGS. 1E and 1F show example trailer 10, a semi-trailer, that includes two cargo-carrying systems as described. Trailer 10 is of an extended length, e.g., at least 40, 45, 50, 55, or 60 feet in length (total length of body 16, front end 12, and aft end 14). Body 16 can have a length of at least 40, 45, 50, or 55 feet. Trailer 10 includes two frames oriented front-to-back along a length of trailer 10, with lengths of the frames aligned along the length of trailer 10. Each frame 102 and deck 120 can have a length of approximately half the length of body 16, e.g., at least 20, 23, 25, or 27 feet. At FIG. 1F, each of the frames (front and back) of trailer 10 supports three individual decks 120, with cargo, which have been loaded individually into each of the two frames 102 of trailers 10 from below, through bottom opening 112 of each frame 102. The first-loaded decks 120 (i) are supported at the highest level (at a first deck-holding height) within frame spaces 114 of frames 102. The second-decks 120 (ii) are supported below decks 120 (i) within frame spaces 114 at second deck-holding heights below the first deck-holding heights of decks 120 (i). The third decks 120 (iii) are supported below decks 120 (ii) within frame spaces 114 at third deck-holding heights that are below the second deck-holding heights of decks 120 (ii).

FIG. 1G shows another example of trailer 10 that includes a cargo-carrying system with features in common with those in FIG. 1A, with an additional feature of enclosed aft-trailer space ("aft-space") 20 located at aft-end 14. Example aft-space 20 is space at the interior of trailer 10 at aft end 14, above wheel set 18, which may have a height and a width that are approximately equal to those of trailer body 16 and frame 102. Aft-space 20 can be considered to be an enclosed extension of trailer body 16, covered and enclosed to form an aft-extended trailer interior. Example aft-space 20 includes aft opening 222 covered by aft-door (i.e., an end-door) 224 at the aft end of aft-space 20 and trailer 10. Aft-door 224 may be, for example, a swinging (gate-style) end door or a roll-up end door. Door 224 may be opened to allow access to aft-space 20 from a space aft and exterior to aft-space 20 (e.g., a loading dock, warehouse, storage facility, etc.), through aft-opening 222. Aft-space 20 is open to and connects with frame space 114 to allow cargo to move between aft-space 20 and frame space 114.

Aft-space 20 includes aft-deck 22, which extends horizontally to define a bottom of aft-space 20 at a level above wheel set 18 and that is on the same level as bottom 108 of frame 102, which is also a level of removable deck 120 when supported at bottom 108 of frame 102. Aft-deck 22 is adapted to support equipment that can be used to move (load or unload) cargo between frame space 114, aft-space 20, and a space that is exterior to aft-space 20, such as an interior space of a loading dock (not shown) that is connected to aft-space 20 through aft door 224. Aft-space 20 is also adapted to optionally support cargo during transit (see, e.g., FIG. 1I). Also shown at FIG. 1G is removable deck 120 with cargo 210, and cargo 230 in the form of cargo pieces (e.g., pallets) that may be separate from a removable deck, e.g., "loose cargo" that may be staged for loading onto trailer 10.

In this example trailer, body 16 and frame 102, including frame bottom 108, are horizontally positioned at a height level that is above the height of wheel sets 18. This example trailer can be specifically adapted to support a removable deck 120 using deck holders (not shown) at a level of frame bottom 108, which is at the level of aft-deck 22, to allow loading equipment to move across aft-deck 22 onto a removable deck 120 supported at a horizontal level of frame bottom 108. Deck holders may be positioned at a bottom of frame supports 110 or on frame bottom 108.

Optionally, to increase the cargo-carrying capacity of frame 102 and frame space 114, one or more of body 16, wheel sets 18, and removable deck 120 may be adapted to move forward-and-rearward relative to one another. For example, removable deck 120 may be adapted to move forward within frame 102 and trailer body 16, relative to body 16 and wheel sets 18, to increase the amount of storage space at aft-end 14, or to shift and optimize the weight positioning of cargo within trailer 10. Additionally or alternately, rear (aft) wheel set 18 may be adapted to move forward or rearward relative to frame 102 and trailer body 16, to allow for trailer body 16 and frame 102 to include a larger bottom opening (112, 8), to allow a longer removable shelf 120 to pass through bottom openings 112 and 8. Additionally or alternately, trailer body 16 with frame 102 may be adapted to move forward and rearward relative to wheel set 18, e.g., to shift and optimize the weight of cargo within trailer 10.

At FIG. 1H, deck 120 has been loaded onto frame 102 from below frame 102 by lifting deck 120 vertically through bottom opening 112, then supporting deck 120 at a deck-holding height within frame 102. Cargo 210, being supported on removable deck 120, has also been loaded into frame space 114 through bottom opening 112. According to alternate methods, cargo 210 may be loaded into frame space 114 onto removable deck 120 by moving the cargo manually (e.g., using a dolly or a forklift) through aft-opening 222 and aft space 20. At FIG. 1I, loose cargo 230 has been loaded into aft-space 20 through aft-opening 222.

Figure 11:
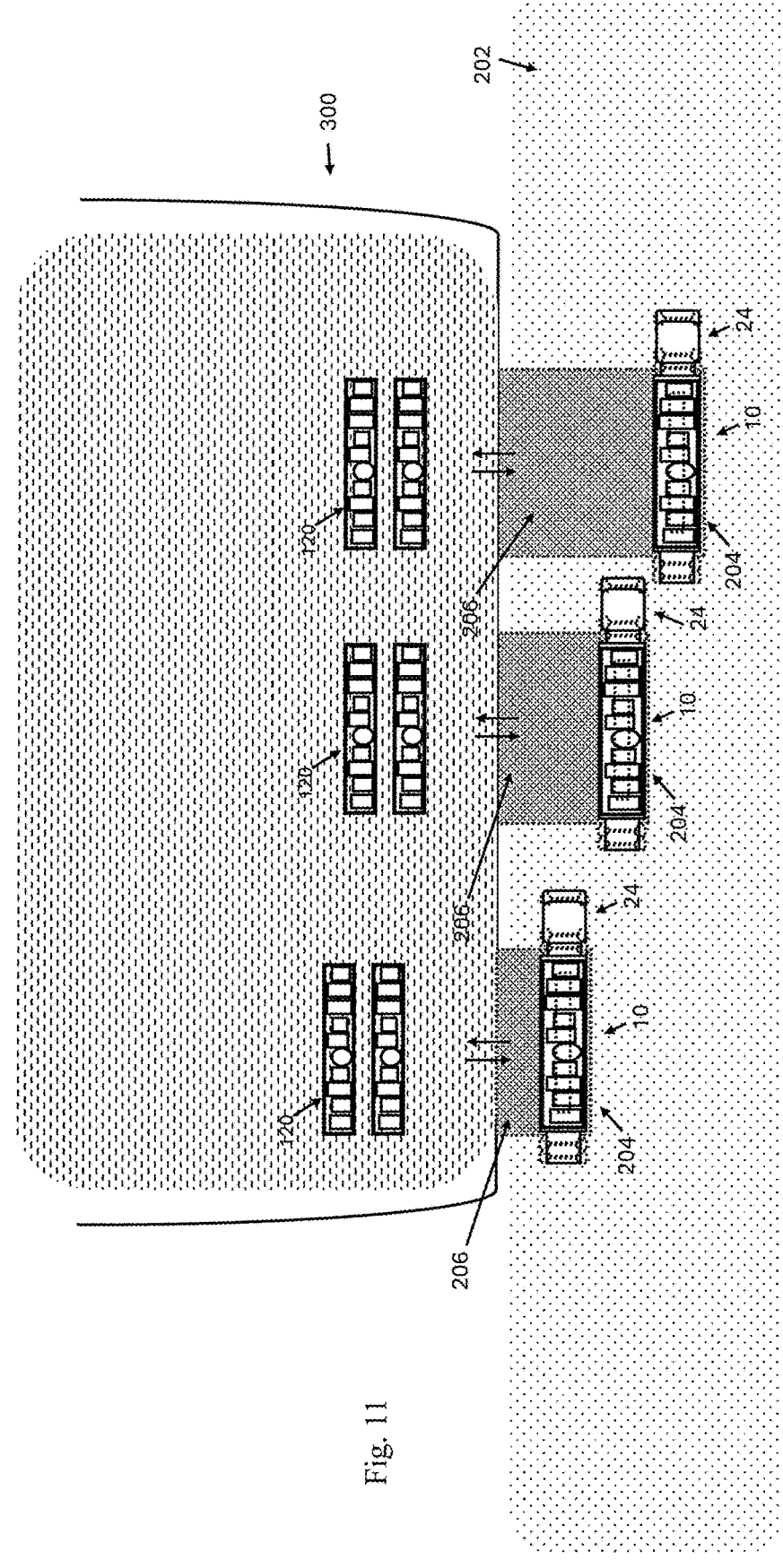
FIG. 11 (schematic top views) shows example loading systems relative to a cargo staging space.

FIGS. 1J and 1K show another example of a bottom-loading trailer 10, this version including selected features in common with trailer 10 of FIGS. 1H and 11, including aft opening 222 and aft door 224, and additionally include one or more moving wheel sets 18. As with example bottom-loading trailer 10 of FIGS. 1H and 11, example bottom-loading trailer 10 of FIGS. 1J and 1K, when used to carry a single removable deck 120 at a bottom of frame 102, may alternately be loaded and un-loaded by an "end-loading" method through aft-opening 222 (e.g., by moving cargo supported on removable deck 120 through aft opening 222), or may be loaded or un-loaded by a "bottom-loading" method that loads or unloads the removable deck 120 with supported cargo onto or from the trailer through bottom opening 8. Deck holders (not shown) may be positioned at a bottom of frame supports 110 or on frame bottom 108 to hold a removable deck at the bottom of frame 102.

As shown, a forward wheel set or a rear wheel set, or both, used to support a bottom-loading trailer may be moved forward-to-back for a purpose of transferring weight supported by the bottom-loading trailer. Or, as pertains particularly to bottom-loading methods as described, one or more wheel sets of a bottom-loading trailer may be moved forward-to-back for a purpose of allowing one or both wheel sets to be selectively positionable beneath the trailer during transit, and then forward or aft of the trailer for loading and unloading a removable deck 120 through the bottom-loading trailer.

One or more wheel sets may be moved forward and back to extend ahead of the front end of the trailer (for a forward wheel set) and to extend behind the aft end of the trailer (for an aft wheel set) during loading and un-loading, thereby moving the wheel set from beneath a bottom opening of a bottom-loading trailer to allow access to the bottom opening from below, optionally and preferably for a full length of the frame. See FIGS. 9E and 9F, generally showing steps of bottom-loading or end-loading a bottom-loading trailer that includes an end door and one or more movable wheel sets.

Referring to rear (aft) wheel set 18 of FIG. 1J, it is supported by a set of rails 30 that extend along lengths of sides of trailer body 16 while not obstructing bottom opening 8 or bottom opening 112. Rails 30 allow the rear wheel set to move forward-to-back relative to trailer body 16. When rear wheel set 18 is moved in a rearward direction, wheel set 18 can be positioned entirely behind the back end of trailer body 16. Rails 30 continue to support trailer body 16 above rear wheel set 18 without obstructing bottom opening 8 or bottom opening 12. See FIG. 1K.

Referring to front (aft) wheel set 18 of FIG. 1J, it is supported by a set of rails 28 that extend along lengths of sides of trailer body 16, preferably without obstructing bottom opening 8 or bottom opening 112. Rails 28 connect through kingpin 32 to prime mover 24 to allow the forward wheel set 18 of trailer 10 to move forward-to-back relative to trailer body 16. When forward wheel set 18 is moved in a forward direction, wheel set 18 is entirely forward of the front end of trailer body 16. Rails 32 continue to support trailer body 16 above forward wheel set 18 but do not obstruct bottom opening 8 or bottom opening 112. See FIG. 1K.

FIGS. 1L and 1M show another example a version of a bottom-loading trailer, this version not requiring an enclosed trailer body but including a frame that includes two horizontal spaced-apart rails that extend between front wheel set 18 and rear wheel set 18 in a spaced arrangement that produces bottom opening 8 of the frame; the illustrated frame may be considered a frame bottom 108 of a frame 102 as otherwise described herein.

As with example trailer 10 of FIGS. 1J and 1K, this illustrated version of a bottom-loading trailer includes one or more moving wheel sets 18, a frame (or frame bottom), and a bottom opening. The frame is adapted to allow a removable deck to pass through the bottom opening 8, and then to allow the removable deck (now shown) to be supported by the frame using deck holders (not shown). The trailer may be loaded with cargo by placing a removable deck (120, now shown) onto the frame and then placing cargo onto the removable deck supported by the frame. Alternately, the example trailer may be loaded with cargo by bottom-loading a laden deck through opening 8 and using the frame and deck holders to support the deck.

More generally, example trailer 10 may alternately and selectively be end-loaded, side-loaded, top-loaded, or bottom-loaded by moving a removable deck through a bottom opening of the trailer and frame. A forward wheel set or a rear wheel set, or both, may be moved away from under the frame and the bottom opening of the frame (see FIG. 1L), to expose the opening and allow a removable deck to be loaded or unloaded through the bottom opening (see FIG. 1M).

Figure 2A:
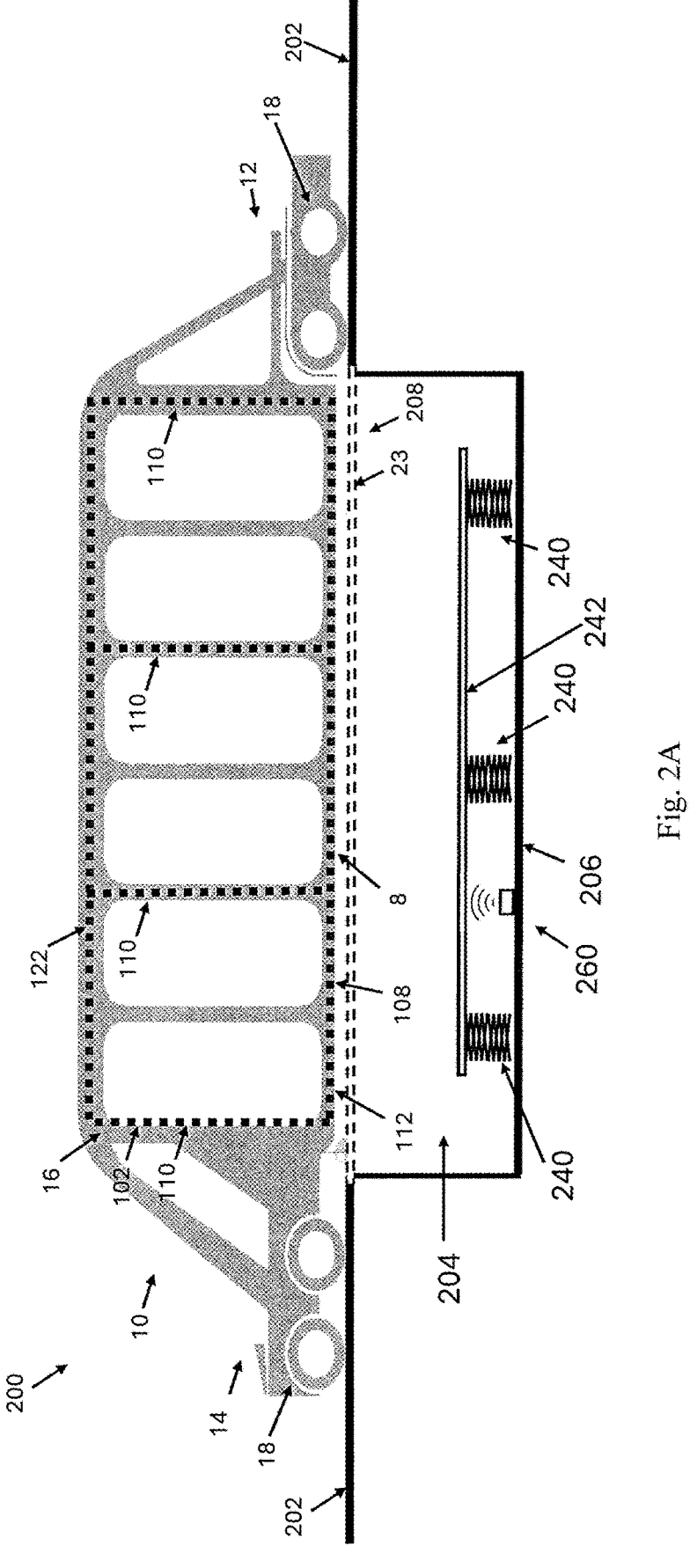
FIGS. 2A and 2B are a side view and a top view of an example bottom-loading trailer positioned relative to a loading platform as described.

FIGS. 2A (side view) and 2B (top view) show an example loading system (or "loading station") 200 that can be used with an example trailer 10 for loading and unloading removable decks 120 onto or from a frame of trailer 10. Referring to FIG. 2A, loading system 200 includes loading platform 242 supported in loading platform space ("pit" or "well")

204 below trailer 10, which is supported on transport deck 202 above loading platform space 204. One or more hoists 240 support loading platform 242 below trailer 10 and frame 102.

Figure 2B:
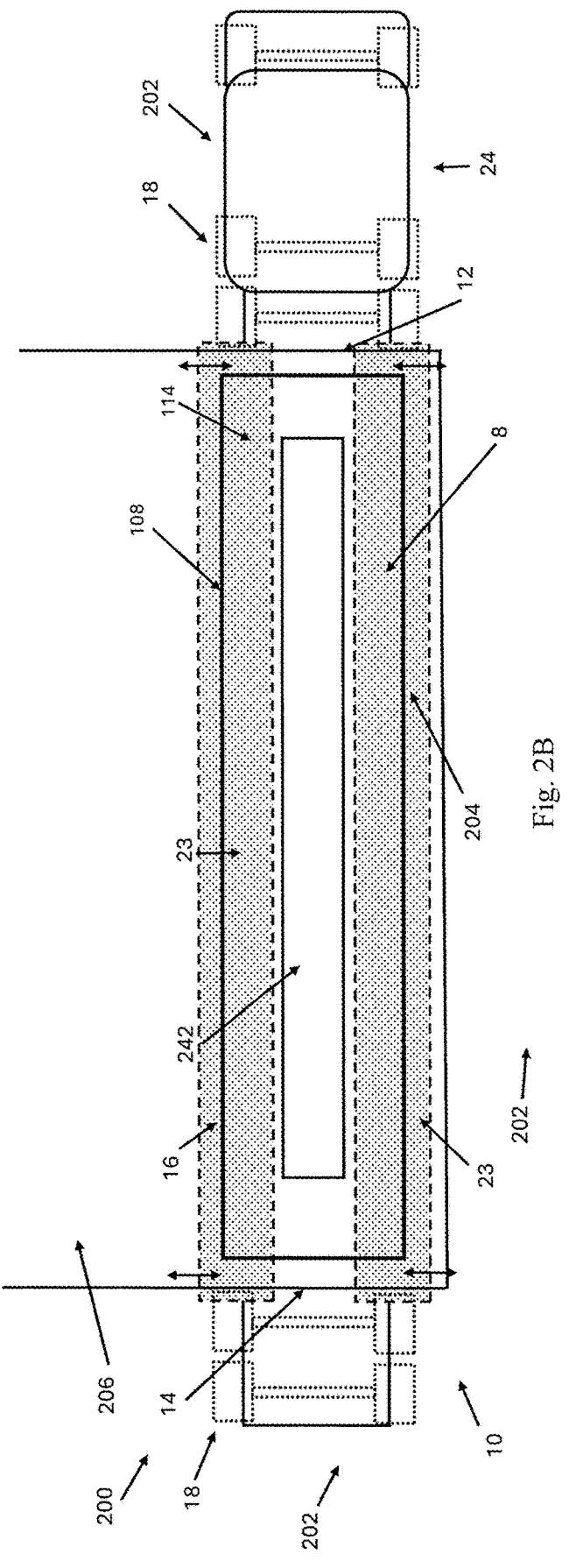

FIG. 2B is a top-down view of loading station 200 that also illustrates prime mover 24, which can be used to position trailer 10 over loading platform space 204. Horizontal gate 23 includes a left-side gate and right-side gate, each positioned longitudinally beneath trailer 10 and above loading platform space 204. As illustrated, the left side gate 23 and the right side gate 23 are each positioned above loading platform space 204 at top opening 208 to allow top opening 208 of loading platform space 204 to be selectively opened and closed, e.g., at least partially covered by gate 23. In a closed or covered position as shown at FIG. 2B, prime mover 24 and trailer 10 can be moved over transport deck 202 and gate 23 to position trailer 10 above loading platform space 204. With trailer 10 positioned above loading platform space 204, gate 23 can be opened (see FIGS. 3A and 3B) to allow access between loading platform space 204 and frame space 114 of a frame of trailer 10 positioned above loading platform space 204, to allow movement of (loading and unloading of) one or more removable decks 120 between frame space 114 and loading platform space 204. After one or more removable decks 120 are loaded into trailer 10, gate 23 can be closed (see FIG. 2B) and prime mover 24 and trailer 10 can be driven over the closed gate and away from loading station 200.

Figure 3A:
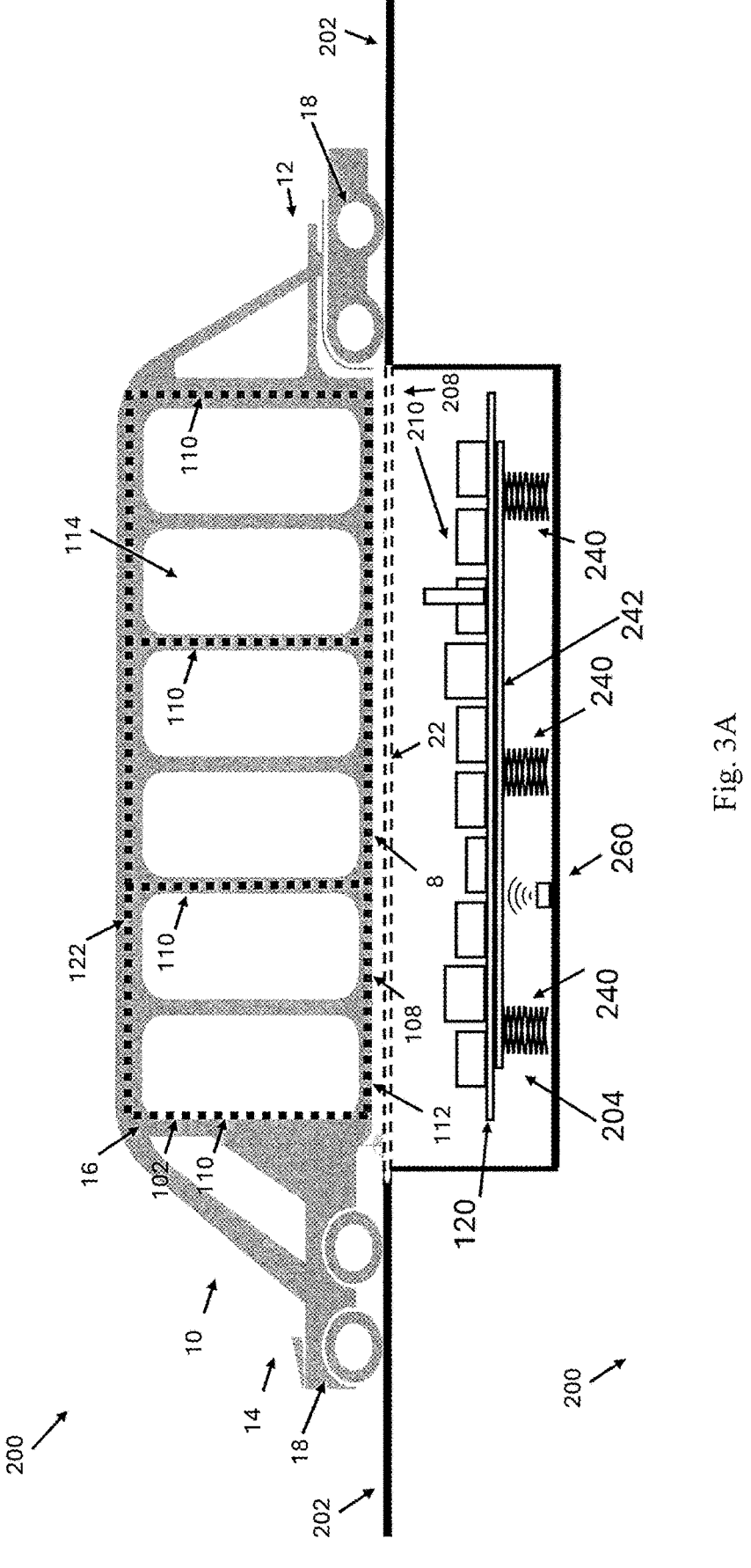
FIGS. 3A and 3B are a side view and a top view of an example bottom-loading trailer positioned relative to a loading platform as described.
Figure 3B:
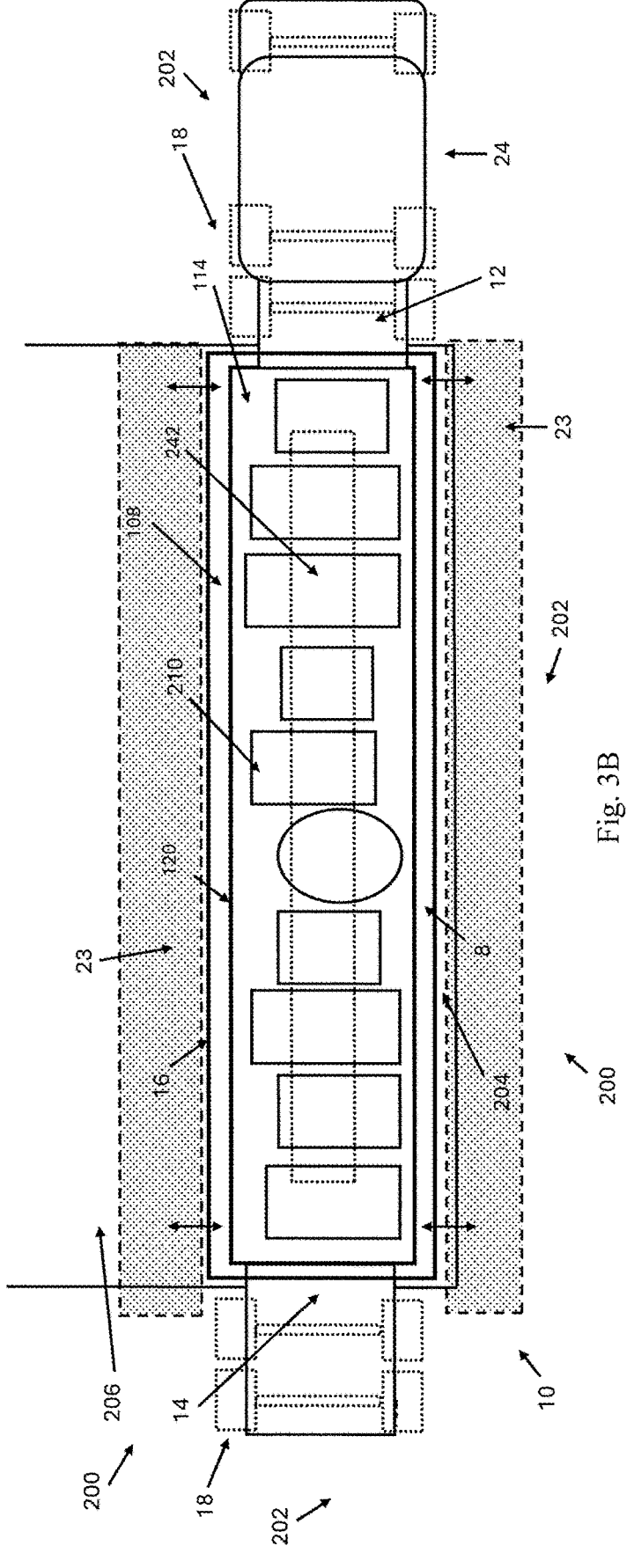

FIGS. 3A (side view) and 3B (top view) show example loading station 200 with removable deck 120 supported by loading platform 242 in loading platform space 204, with cargo 210 supported on deck 120, and with gate 23 open to allow access between frame space 114 and loading platform space 204.

Example system (loading station) 200 is also illustrated to include an optional height sensor 260 that is positioned below removable deck 120 within loading platform space 204 and is adapted to sense a height of a removable deck 120 as the deck is being lifted or lowered within frame space 114. During a step of elevating a removable deck 120 within frame space 114, the height location of the removable deck can be monitored and raised to a level to produce minimum clearance between cargo supported by the removable deck and a frame top 122 or a bottom of a removable deck that is supported within frame space 114.

Referring to FIGS. 4A, 4B, 4C, 4D, 4E, 4F, and 4G, illustrated is a sequence of operations of an example method of loading three individual removable decks 120 with cargo 210 into frame 102 in a top-to-bottom fashion by loading a first removable deck into a top position of frame 102 at a first deck-holding height, loading a second removable deck into frame 102 at a second deck-holding height below the first deck-holding height, and then loading a third removable deck into frame 102 at a third deck-holding height that is below the second deck-holding height.

Figure 4A:
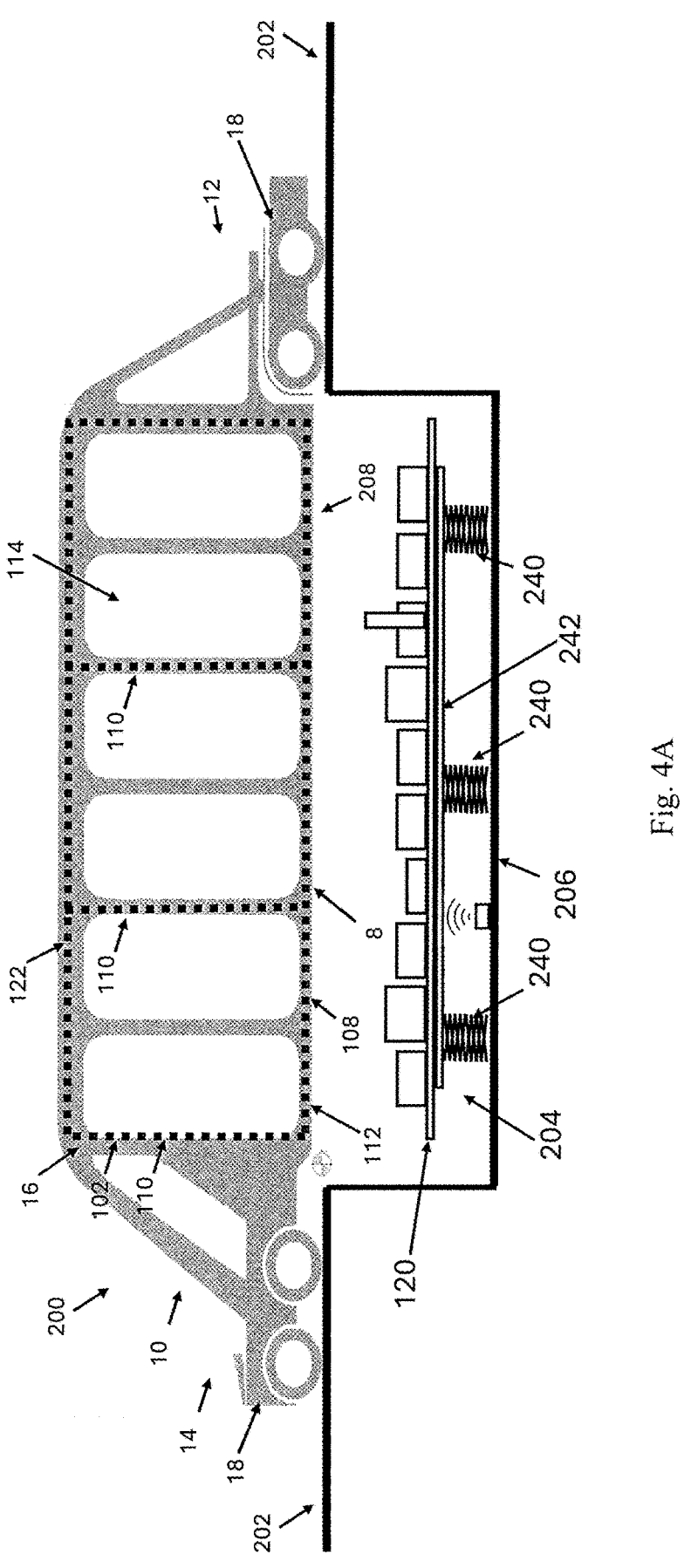
FIGS. 4A, 4B, 4C, 4D, 4E, 4F, and 4G are side views of example trailers, removable decks, and steps of loading removable decks onto an example bottom-loading trailer as described.
Figure 4B:
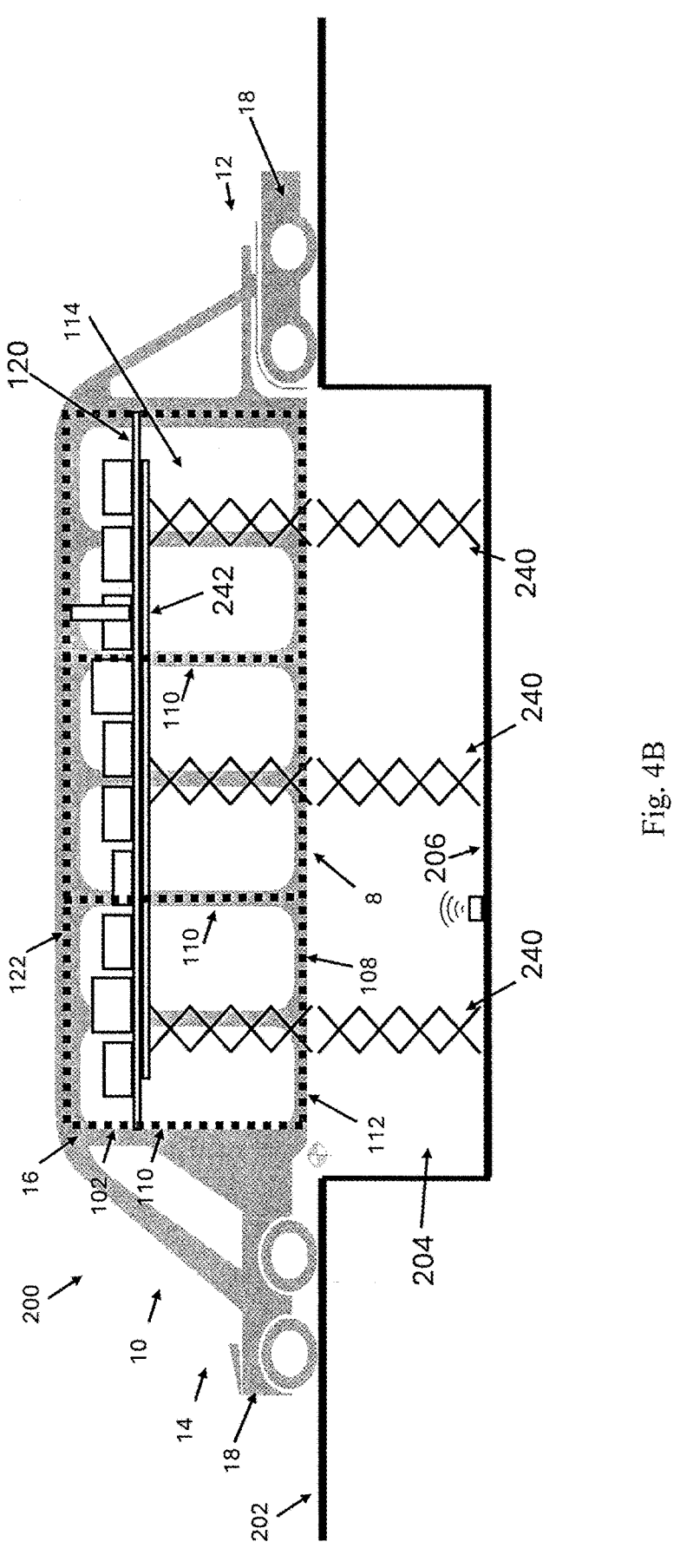
Figure 4C:
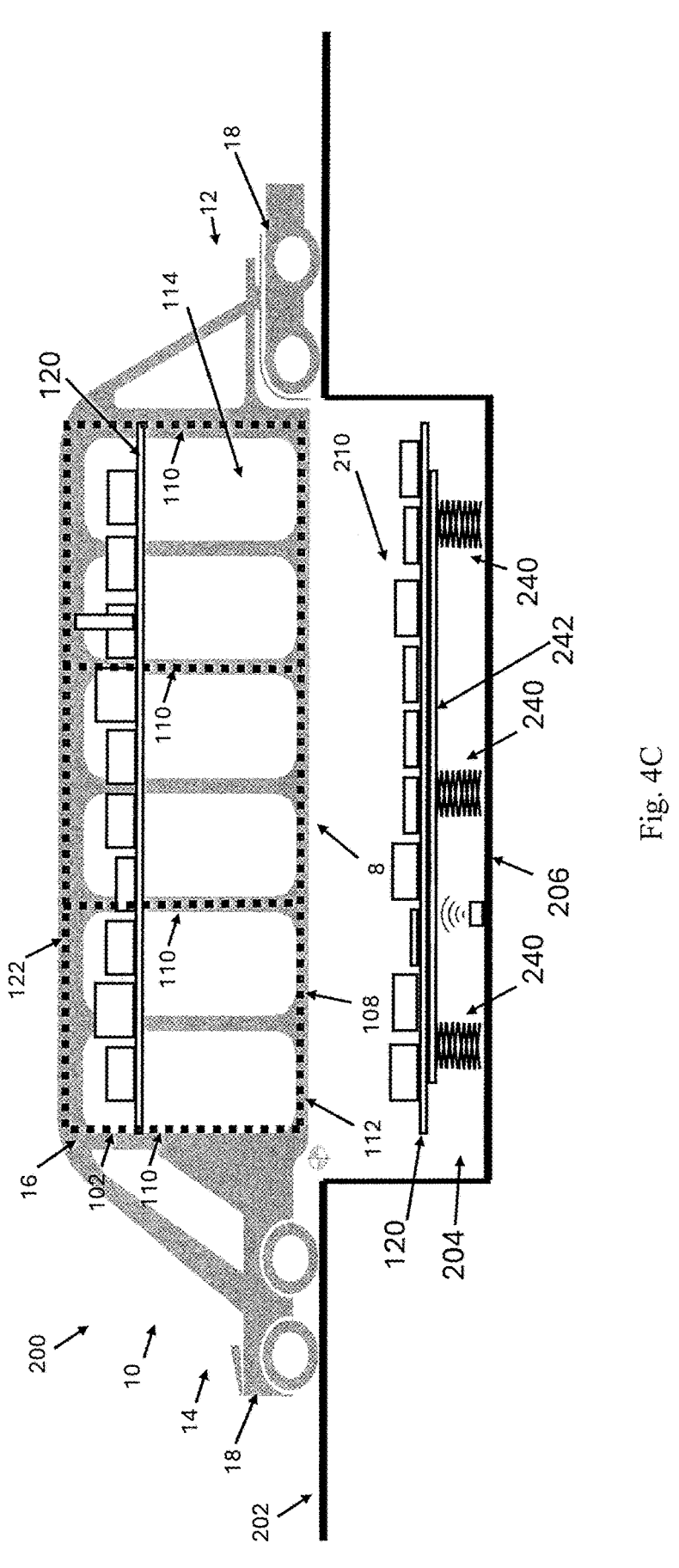
Figure 4D:
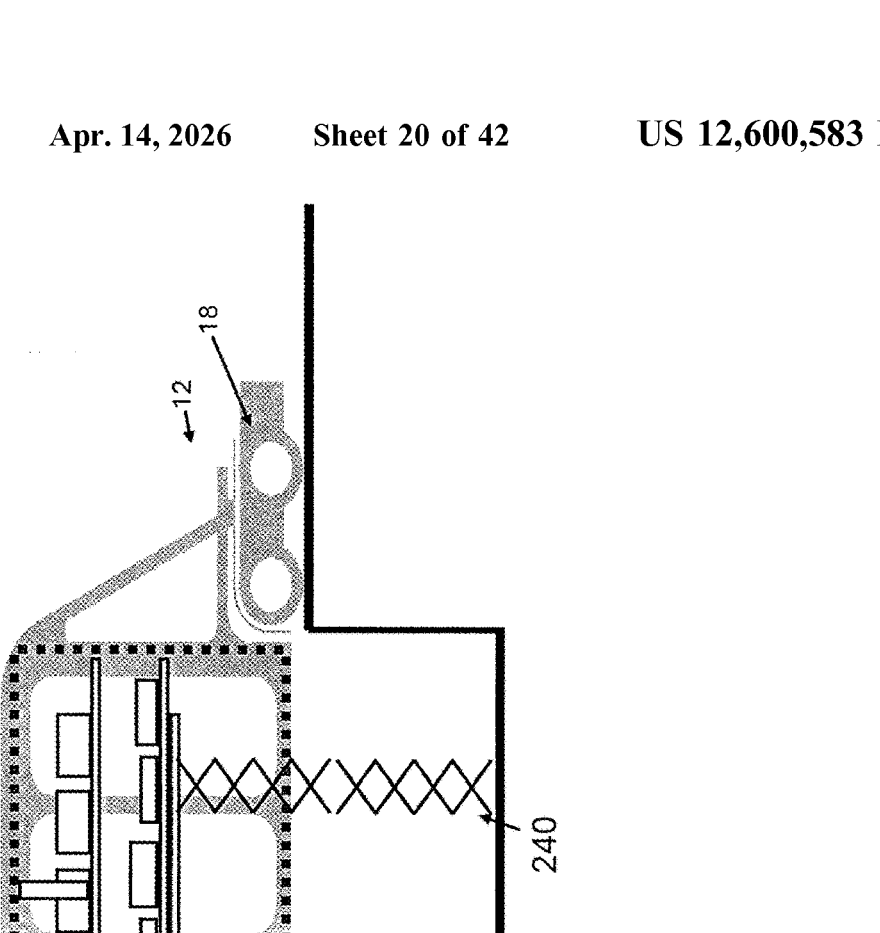
Figure 4E:
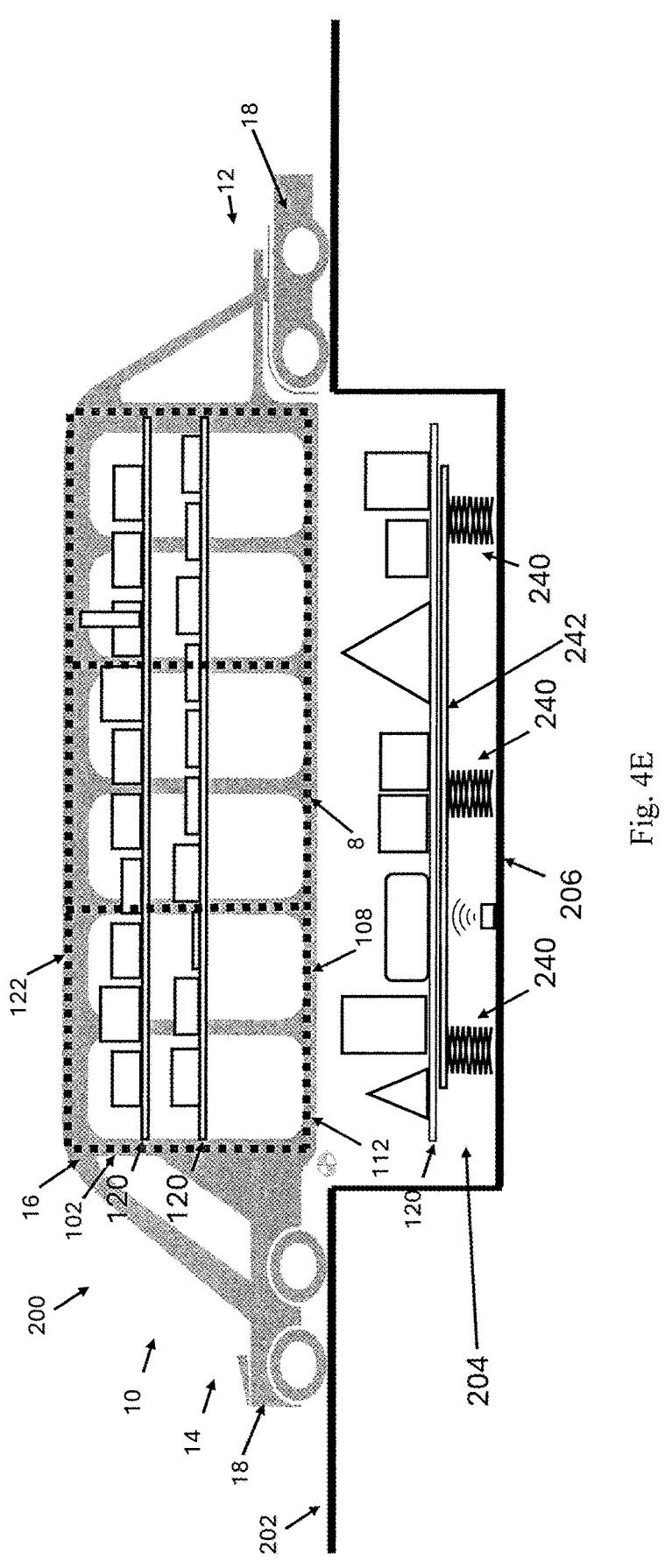
Figure 4F:
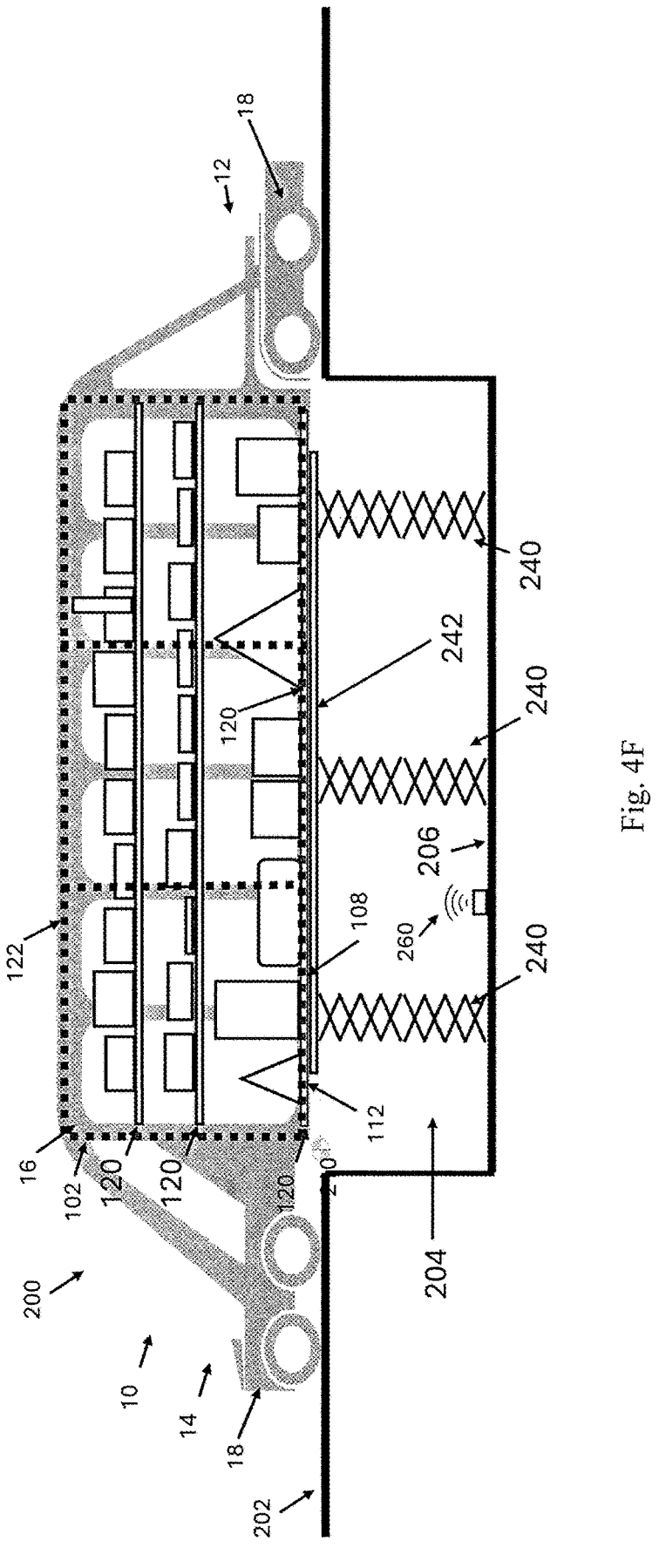
Figure 4G:
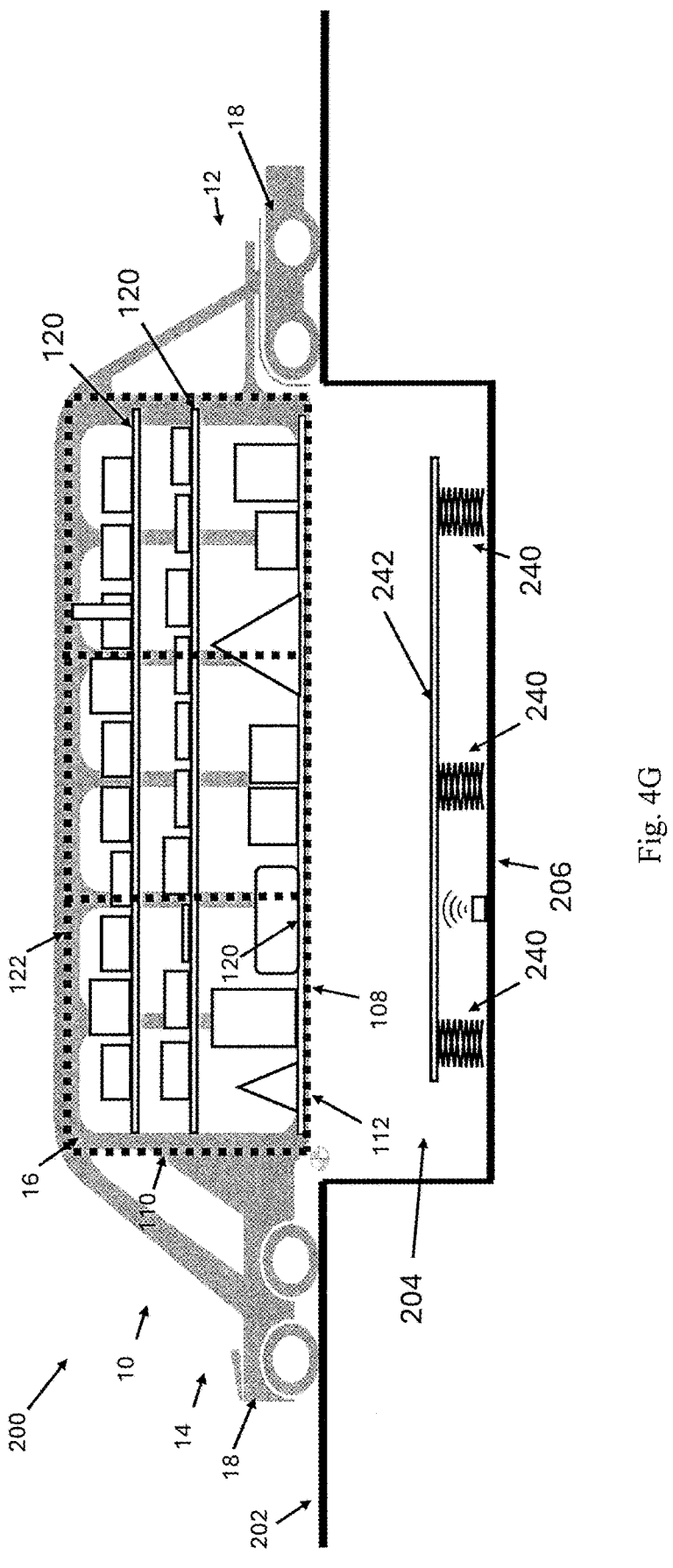

Frame 102 is illustrated to be positioned as part of loading station 200 as described, above a loading platform space 204 that includes loading platform 242 supported by one or more hoists 240 within loading platform space 204. Referring to FIG. 4A, removable deck 120 begins in a loading position below transport deck 202, below trailer 10 and frame 102, and with a length and width of removable deck 120 aligned with a length and width of frame space 114 of frame 102. From the loading position (see FIG. 4A), removable deck 120 is moved vertically into frame space 114 while being supported by loading platform 242, which is raised by hoists 240 to a first frame-holding height (see FIG. 4B). Removable deck 120 is then supported at the first frame-holding height by deck holders (not shown) (see FIG. 4C) and the weight of removable deck 120 and its supported cargo 210 is transferred to the deck holders, which are supported by frame 102. Loading platform 242 is lowered back to the loading position (i.e., lowered into loading platform space 204) while removable deck 120 remains supported at the first deck-holding height at an upper position of frame space 114 by deck holders (not shown). See FIG. 4C.

With the first removable deck 120 being loaded into and supported at the first deck-holding height in frame space 114, the second removable deck 120 is raised into frame space 114 and supported at a second deck-holding height that is below the first deck-holding height. (See FIGS. 4D and 4E). At FIGS. 4E, 4F, and 4G, a similar loading sequence is used to load a third removable deck 120 into frame space 114 and to support the third removable deck at a third deck-holding height that is below the second deck-holding height, then to remove loading platform 242 from frame space 114. Trailer 10, with loaded decks 120, may be moved from loading station 200 and transported to a destination for un-loading or trans-loading.

Figure 5A:
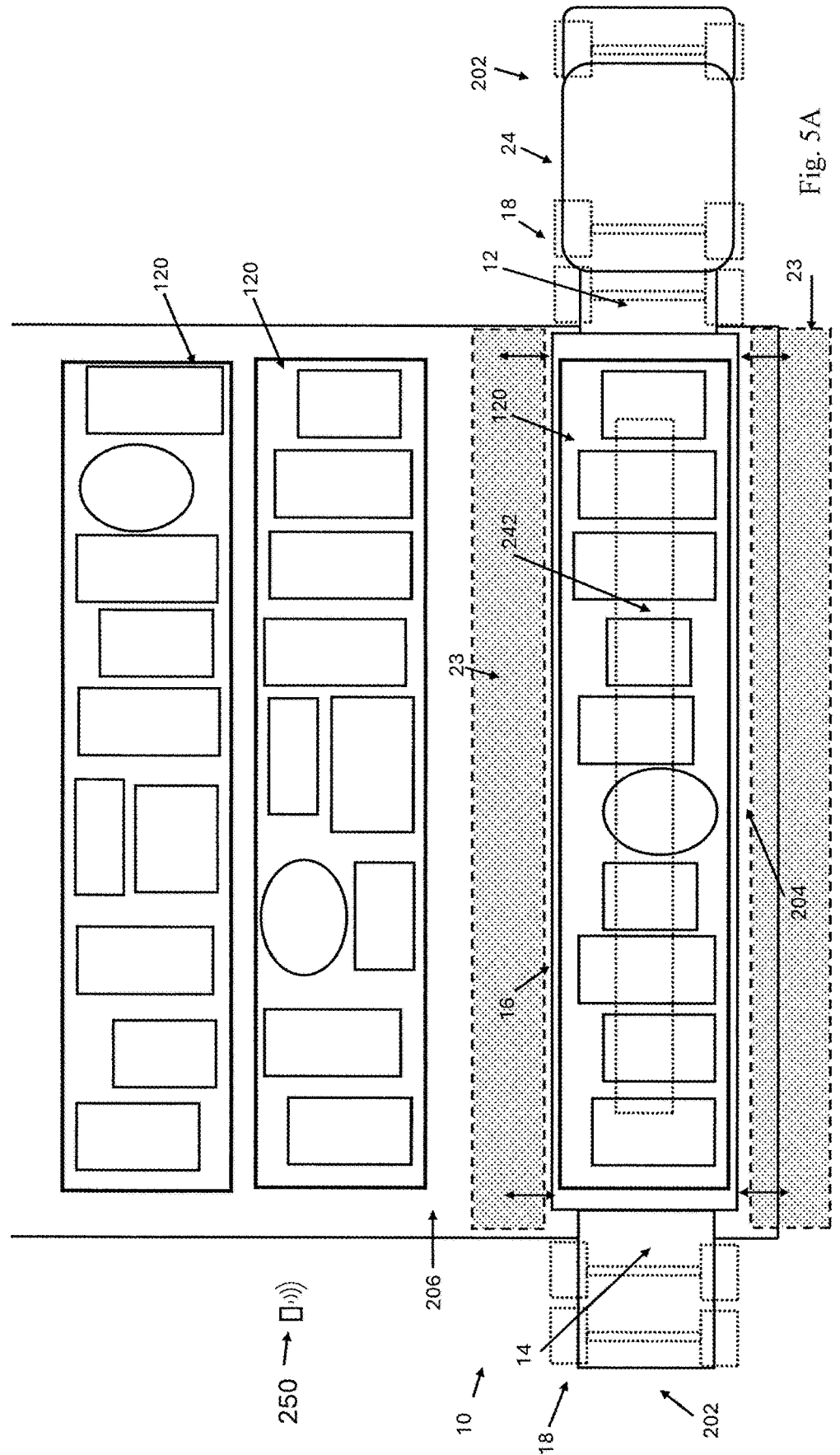
FIGS. 5A and 5B (schematic top views) show example loading systems relative to a cargo staging space.
Figure 5B:
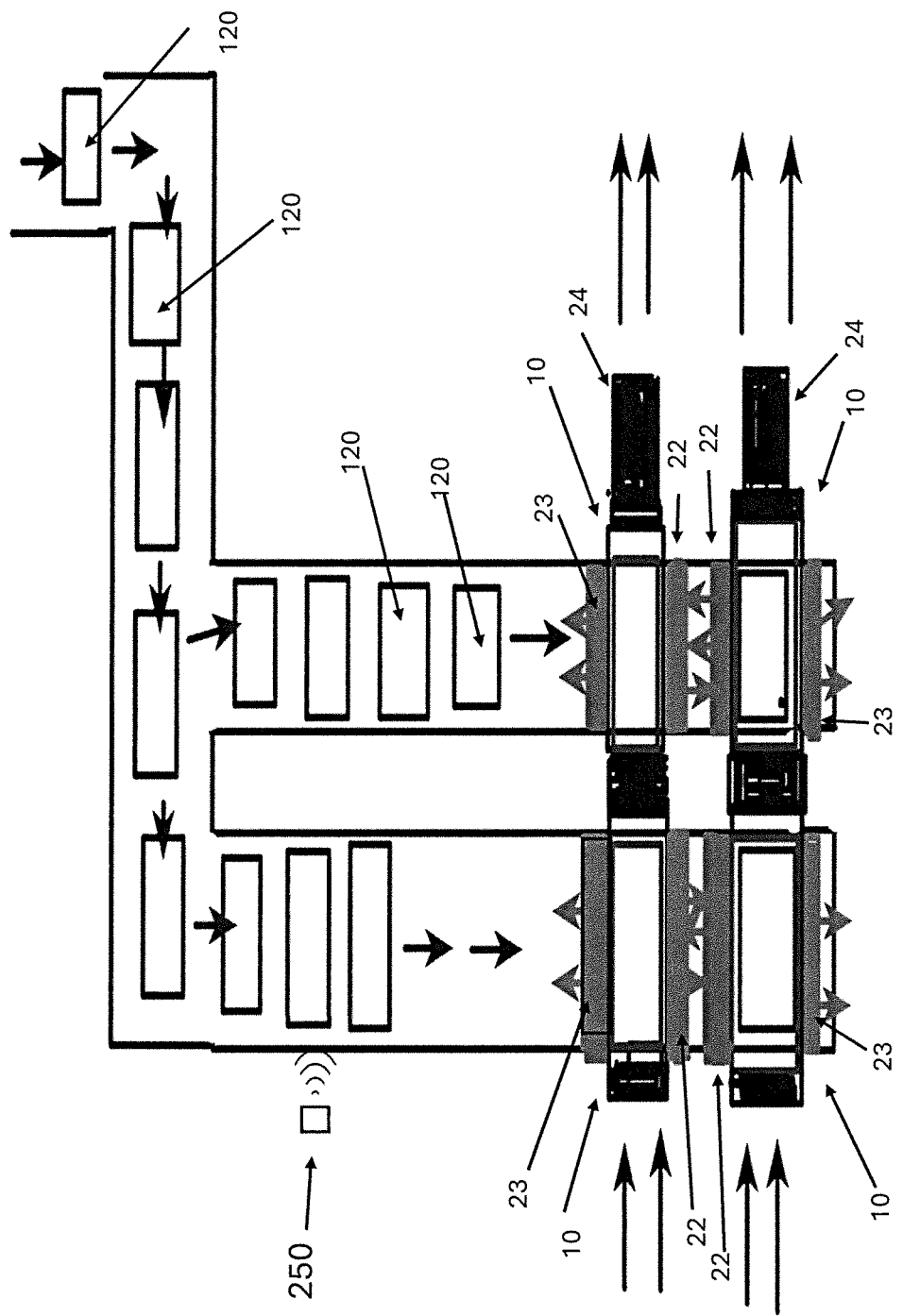

FIGS. 5A and 5B show top views of example loading station 200 during loading or unloading of an example bottom-loading trailer 10. At FIG. 5A, loading station 200 is adjacent to a staging space 206 that includes multiple removable decks 120 that have been moved, for example, from a deck-loading space (not shown) to staging space 206, to be moved next onto loading platform 242 in loading platform space 204 for loading into trailer 10. As illustrated, gate 23 is in an opened position to allow vertical movement of decks 120 through bottom opening 112 of frame 102, between frame space 114 and loading platform space 204.

FIG. 5B shows multiple loading stations 200, each being used to load and unload a set of two trailers 10 which are part of a B-train. Loading stations 200 are adjacent to a staging space 206 that includes multiple removable decks 120 that have been moved, e.g., from a deck-loading space (not shown) to staging space 206, to be moved next into a loading platform space 204, onto a loading platform 242 in loading platforms space 204, and loaded into trailer 10.

Loading system 200 is illustrated to include an optional height sensor 250 that is positioned above deck 120 and cargo 210 in staging space 206, and is adapted to measure a maximum height of the individual pieces of cargo 210 on each removable deck 120. A height sensor may be useful to determine a maximum height of cargo supported on a particular removable deck 120 for a purpose of determining a deck-holding height for the removable deck within frame space 114. According to example methods of loading one or more removable decks 120 into a frame space 114, a measured maximum height of cargo supported on a removable deck can be used during a loading step to select and optimize a deck-holding height for a removable deck as the removable deck is being loaded vertically into a frame space in a top-to-bottom deck-loading order. A deck-holding height of a removable deck may be selected to position the deck with the cargo piece having a maximum height at a distance that is less than 2 feet, e.g., less than 1 foot or 6 inches below a bottom of a next-higher removable deck supported in the frame space.

Figure 6A:
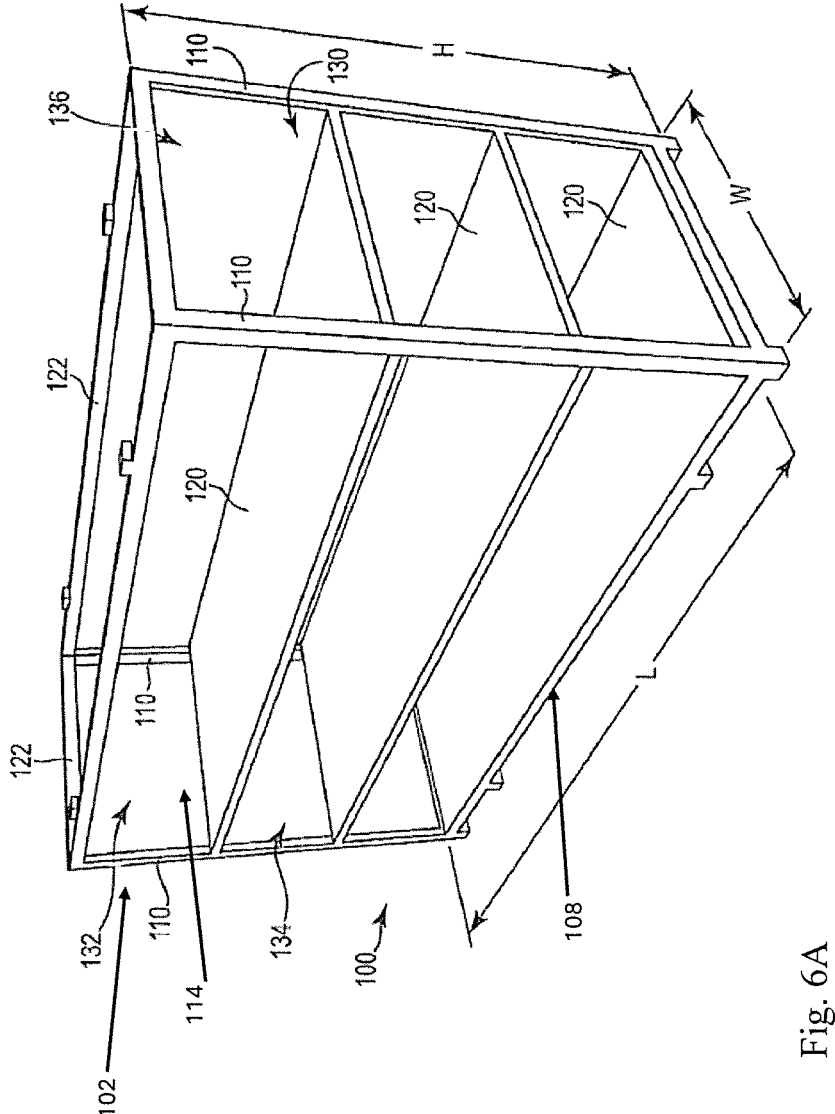
FIGS. 6A and 6B are side perspective views of example frames as described, which may be incorporated into a bottom-loading trailer, a bottom-loading railcar, or other bottom-loading cargo transport vessel.
Figure 6B:
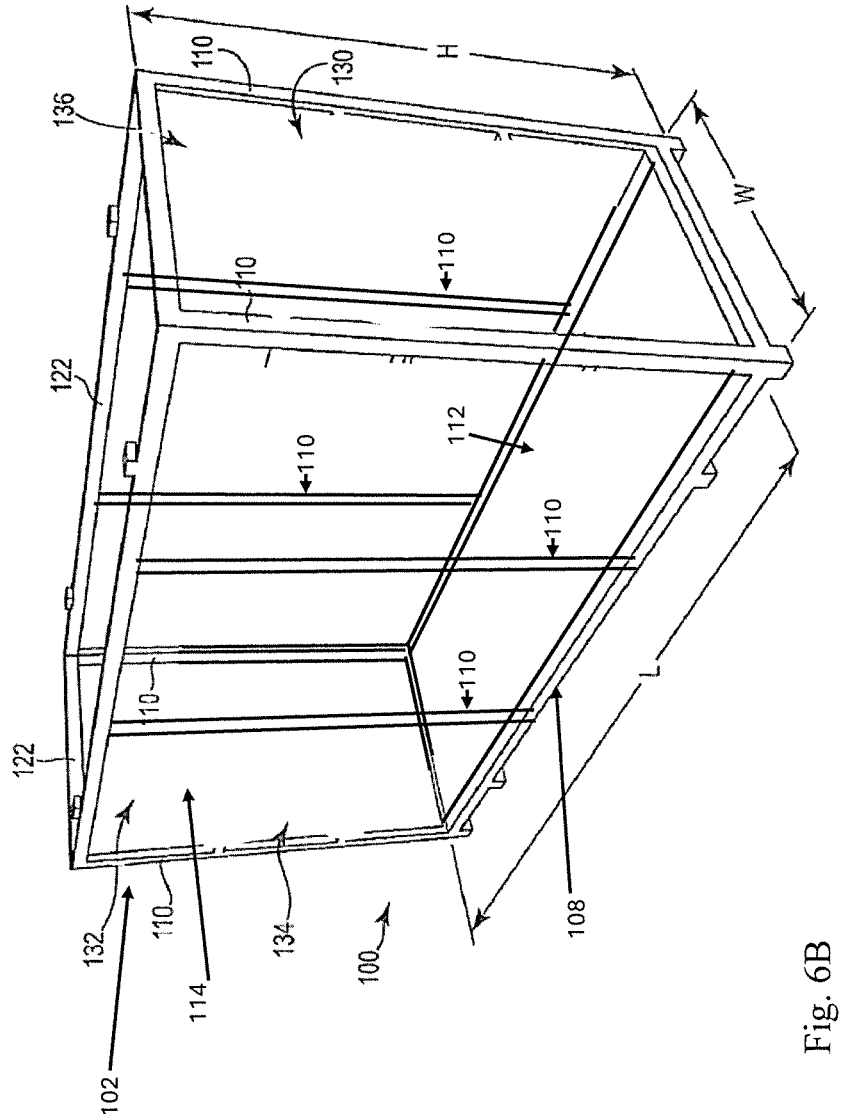

FIGS. 6A and 6B show example frame 102 and removable decks 120 of example cargo-carrying systems 100 that may be incorporated into a bottom-loading trailer, a bottom-loading railcar, a bottom-loading cargo container, or another type of bottom-loading cargo transport vessel and used (loaded, unloaded, transported, etc.) as described herein.

An example cargo-carrying system 100 may include a frame 102 and one or multiple removable decks 120. Frame 102 can be considered to have two "sides" 134 and 136 having length "L" and height "H," and two "ends" 130 and 132 having width "W" and height "H." Each deck 120 may be removed and entirely detached (separated) from frame 102 to allow cargo to be loaded onto the deck at a location away from frame 102, after which, each removable deck 102 that has cargo supported on the removable deck 102 can be loaded into frame space 114 of frame 102.

Example frame 102 includes vertical supports 110 (a.k.a., "vertical frame supports") in the form of vertical posts (as illustrated), frame bottom 108, and frame top 122, which together define three-dimensional frame space 114 therebetween. Frame bottom 108 includes bottom opening 112 to allow a removable deck 120 to be loaded and unloaded into frame space 114 by being vertically elevated through the bottom opening from a space below the bottom opening.

Not illustrated at FIGS. 6A and 6B but included as part of cargo-carrying system 100 are deck holders that provide a rigid, mechanical, supportive connection between vertical supports 110 and a removable deck 120 to support the removable deck within frame space 114. Generally, a deck holder is any support structure that provides a supportive engagement between a frame 102 (such as but not necessarily at a vertical support 110) and a removable deck 120, that is useful to support the removable deck within frame space 114 during transport and handling of the frame while supporting the removable deck.

According to examples, multiple deck holders may be arranged on a frame, e.g., on vertical supports, at multiple lengthwise locations along a length of the frame, to engage a removable deck at multiple locations along lengthwise edges of the removable deck. According to these examples, a deck holder may be a "static" deck holder that is adapted to support a removable deck in a fixed (static) position within a frame space and relative to a frame and vertical supports of the frame in each of an x-direction (along a length L), a y-direction (along a width W), and a z-direction (along a height H), while the removable deck is supported at a deck-holding height by the deck holder during movement of frame 102 containing one or more removable decks 120.

An example static deck holder used to support a removable deck produces a mechanical engagement between a frame (e.g., a vertical support), the deck holder, and a removable deck, that mechanically supports the removable deck in a frame space and restricts, inhibits or prevents, movement of the removable deck relative to the frame (e.g., vertical supports) in a y-direction, in an x-direction, and in a z-direction. The deck holder, frame (e.g., vertical support), and removable deck do not require and may exclude any device or mechanism that is designed to reduce friction between the removable deck and the deck holder or the frame (e.g., vertical support) for a purpose of facilitating horizontal movement of the removable deck relative to the frame (e.g., vertical support) in either the x-direction or the y-direction; for example, a combination of a removable deck and a deck holder does not require and may specifically exclude any form of friction-reducing device such as a bearing, roller, moving surface, or low-friction surface or engagement or mechanism that is included in any of these structures for a purpose of allowing or facilitating horizontal movement of the removable deck relative to the frame or a vertical support or other structure thereof, or the deck holder, while the removable deck is engaged with the deck holder, such as while the weight of the removable deck is supported by the deck holder.

Example deck holders may include any support structure that connects to a frame (e.g., at a vertical support) and positions the deck holder or a portion of the deck holder within the frame space to contact and support a removable deck within the frame space. A deck holder may be a device that is attached or attachable, permanently or in an adjustable manner, to the frame, e.g., to a vertical support, in the form of a length-wise rail, a small "ledge," or "shelf," or another type of horizontal surface that extends from the frame into the deck space and upon which a removable deck may be supported. Alternate deck holders may be in the form of a horizontal "peg," which may be round, rounded, square, or rectangular, etc., in cross section and that extends through an opening of a vertical support or other structure of a frame while being connected to a removable deck to provide a support surface for the removable deck within the frame space. Another version of a deck holder may be a device that is secured to a vertical support and can be movable (extendable, retractable, rotatable, liftable, etc.) relative to the vertical support to allow the deck holder to be selectively moved into and removed from the frame space while remaining attached to a vertical support.

According to example cargo-carrying systems, one or multiple deck holders can be located within frame space 114 along a length L of frame 102, at or between vertical supports 110, to engage and support a removable deck 120 at one or more location along a length (L) of a side of the removable deck. A deck holder may include structure attached to the frame, e.g., at a vertical support, that extends (permanently or movably) into the frame space to engage a surface of the removable deck at a support location ("support surface") of the removable deck, which may be a bottom surface of the removable deck, a surface of an opening (aperture) located at a side position along a length of the removable deck, or another surface.

Alternately or in addition, a deck holder may include a structure that is attached to or incorporated into the removable deck and that is movable (horizontally) to extend from a retracted position (e.g., within the removable deck) to an extended position (extending from a side of the removable deck) that causes the deck holder to engage a support surface of the frame, e.g., of a vertical support, which may be, for example, a horizontal support surface in the form of an opening or aperture in a vertical support that is adapted to receive a complementary component of a deck holder (e.g., peg) that extends from the removable deck.

According to certain examples, a deck holder may be permanently secured to (not designed to be movable relative to) a frame, e.g., at a vertical support, and is not designed or adapted to be moved vertically to adjust a height location of the deck holder along a height of the frame or a vertical support. One or more removable decks may be loaded into the frame space and supported by deck holders that are permanently fixed (and not height-adjustable) to the frame at different deck-holding heights. A removable deck may be moved into the frame space and positioned above the deck holder and then lowered onto the deck holder permanently attached to the frame (e.g., vertical support) at a deck-holding height that is not vertically adjustable. A frame may include multiple deck holders positioned regularly (e.g., at intervals of 1, 1.5, or 2 feet) along the height of the frame at desired height levels to allow a removable deck to be supported in the frame space at a selected deck-holding height based on a size (e.g., maximum height) of cargo supported by the removable deck.

According to other examples, a deck holder may be adapted to be selectively connected and disconnected (secured and removed) at multiple different height positions along the height of the frame, e.g., a vertical support. The deck holder can be secured to the vertical support at a desired deck-holding height prior to or during a step of loading a removable deck into the frame space. Alternately, a removable deck can be loaded into the frame space and a deck holder can be actuated to connect the removable deck to the frame, e.g., at a vertical support, at a selected deck-holding height. Such a vertically-adjustable deck holder may be positioned along the height of the frame at a desired height level that allows a removable deck to be supported in the frame space at a selected deck-holding height based on a size (e.g., maximum height) of cargo supported by the removable deck.

Optionally, a deck holder that is connected to a frame (102), e.g., at a vertical support (110), can be adapted to be extended and retracted relative to the frame by use of a source of pressurized air, i.e., by pneumatic pressure. A deck holder may be biased (e.g., by a weight, by a spring, or otherwise) to be extended into frame space 114, with no pneumatic pressure applied to the deck holder. The deck holder may be retracted by applying pneumatic pressure to the deck holder.

FIGS. 6A and 6B show example frame 102 that includes frame space 114 that extends entirely along a length L and entirely along a width W of frame 102. FIG. 6B shows frame 102 without removable decks 120 positioned within frame space 114, and with additional (optional) vertical supports 110 (shown, for example, as vertical posts) at positions along length L of frame 102 at sides 134 and 136. Vertical supports 110 can be used with deck holders (not shown) to support a removable deck in frame space 114 with support locations along a length of the removable deck and along a length L of frame 102. Frame bottom 108 of FIG. 1B defines bottom opening 112 that allows access between frame space 114 and a space (e.g., a loading platform space, see below) below frame bottom 108.

According to general methods of using a cargo-carrying system as described, a removable deck is positioned in a loading position below a frame space, e.g., oriented with a length of the removable deck aligned with a length of the frame and a frame space. The removable deck can be moved vertically into and within the frame space through the bottom opening. Once positioned at a desired height within the frame space, the removable deck is supported within the frame space at a deck-holding height by a deck holder (e.g., multiple deck holders) that engages the removable deck and the frame, e.g., at a vertical support, with the weight of the deck being supported by the frame through the deck holder. As described herein, a loading platform positioned within the frame space can be used to move the removable deck vertically into and then position the removable deck vertically within the frame space.

Figures 7A, 7B:
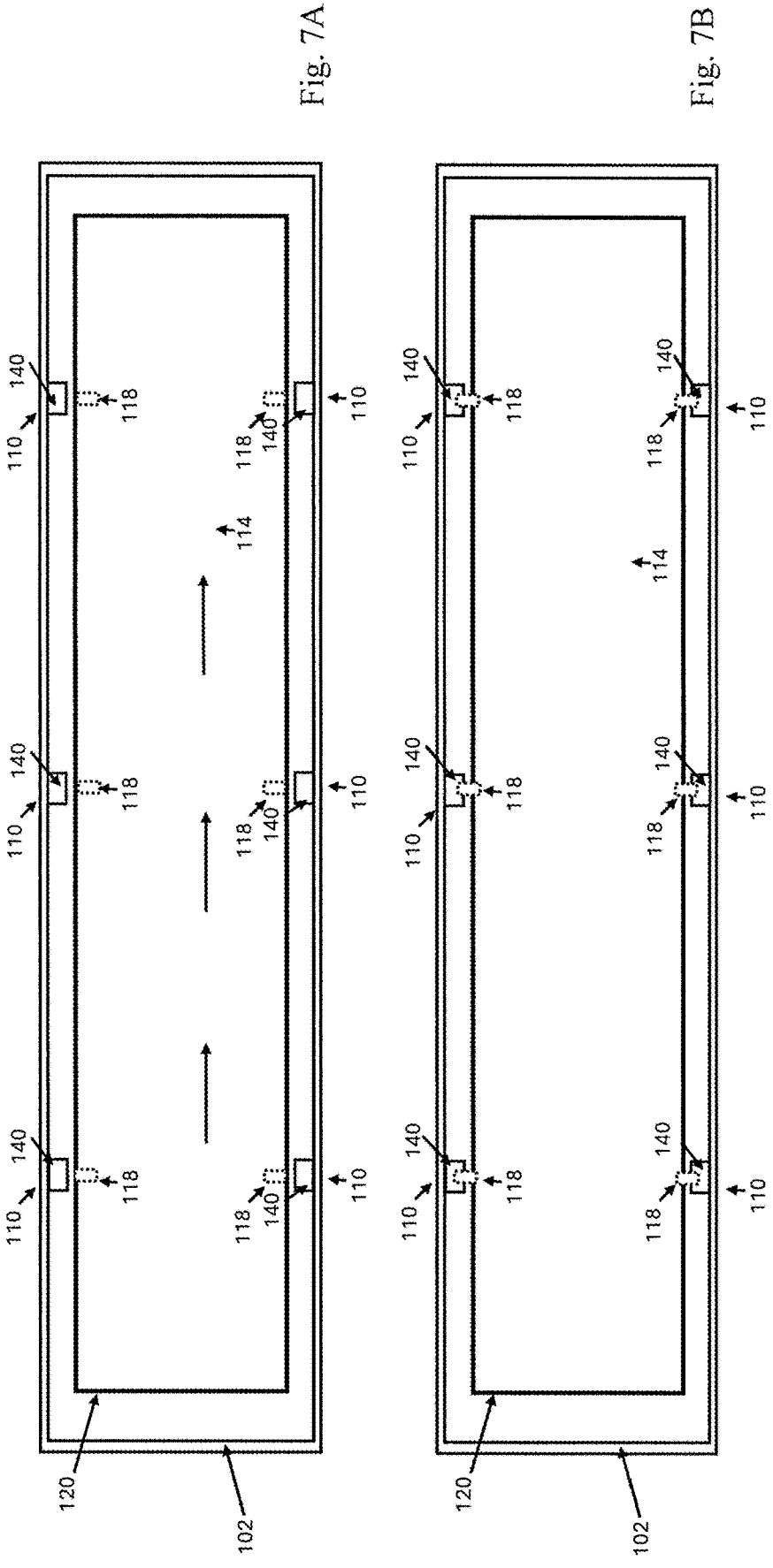
FIGS. 7A (top view), 7B (top view), and 7C (side perspective view) show components of an example cargo-carrying system and example steps of loading a removable deck onto a frame.
Figure 7C:
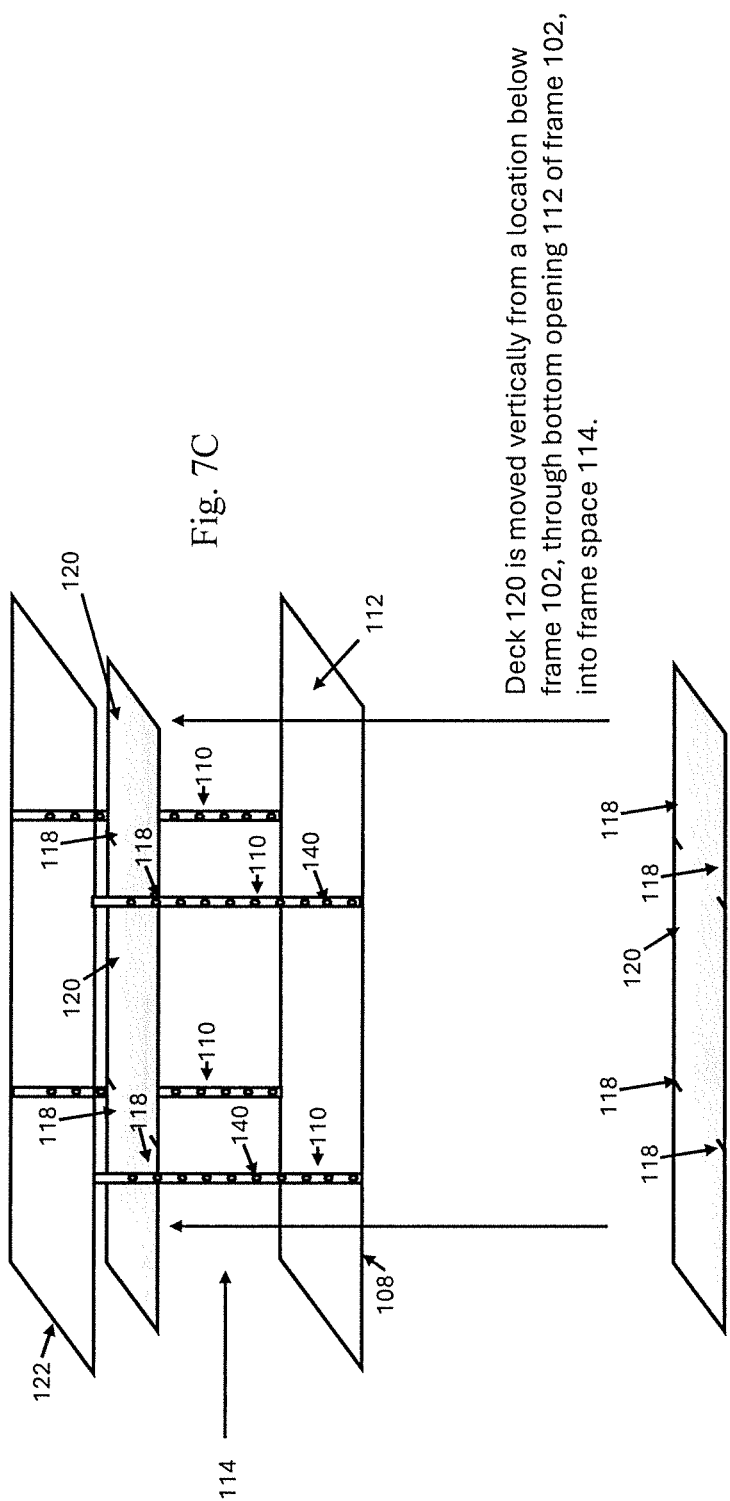

FIGS. 7A, 7B, and 7C show details of a specific example of removable decks 120, frame 102, deck holders 118, and steps of loading example removable decks 120 into frame space 114 of frame 102 and supporting the removable decks in frame space 114 using deck holders 118. According to the examples shown at FIGS. 7A and 7B, multiple deck holders 118 are in the form of movable (extendable and retractable) extensions such as pins (which may be circular, square, or rectangular in cross section), hooks, or the like, that are incorporated into the structure of a removable deck 120 at multiple locations along a length of the removable deck, at the deck edge. Frame 102, for example at vertical supports 110 of frame 102, includes support structure that is complementary to deck holders (movable extensions) 118, such as a frame support surface in the form of openings 140 (shown generally as being included as part of vertical supports 110), which may be round, square, or rectangular in cross section, that are adapted to receive the deck holders 118 when extended from the sides of removable deck 120. Extendable deck holders 118 may be attached to a manual or electronically automated mechanism (not shown in the figures) that can be used to actuate (extend or retract), individually or together, each of the deck holders 118.

During movement of each removable deck 120 vertically within frame space 114, deck holders 118 are in a retracted position to avoid contacting vertical supports 110 or any other structure of frame 102. See FIG. 7A. As a removable deck 120 is moved vertically within frame space 114, deck holders 118 are aligned with support surfaces (e.g., openings) 140 of a vertical support 110 and, when aligned, are extended from the sides of removable deck 120 to engage the support surfaces (openings) 140. See FIG. 7B. Deck holders 118, when extended from removable deck 120, in frame space 114, engage frame support surfaces 140 to provide static support for removable deck 120 relative to vertical supports 110, frame 102, and frame space 114. As shown at FIG. 7C, a first removable deck 120 loaded from below frame space 114, vertically upward into frame space 114, is supported at a first deck-holding height by deck holders 118 engaged with removable deck 120 and vertical supports 110 at openings 140.

Note that FIGS. 7A and 7B show extendable deck holders 118 being incorporated into removable deck 120, and complementary frame support surfaces (openings) 140 being incorporated into vertical supports 110. In alternate examples of cargo-carrying systems, extendable deck holders 118 may be incorporated into vertical supports 110 and complementary support surfaces (openings) 140 may be incorporated into removable decks 120.

FIGS. 8A, 8B, 8C, 8D, and 8E show details of another example of removable deck 120, frame 102, deck holders 118, of an example cargo-carrying system, and example steps of loading the example removable deck 120 into frame space 114 of frame 102 and supporting the removable deck in frame space 114 using deck holders 118.

According to these examples, multiple deck holders 118 in the form of non-movable extensions (which may be referred to as "steps," "ledges," "platforms," "horizontal deck holder surfaces," or the like) are incorporated into the structure of frame 102, for example (as illustrated) as part of one or more vertical supports 110, and extend from vertical support 110 horizontally into frame space 114. See also the end-view illustration of frame 102, deck holders 118, and removable deck 102 at FIG. 8E.

These deck holders 118 may be considered to be "permanent" or "non-movable" in that, for purposes of their use and construction as a component of frame 102, they are designed to be continually attached to vertical support 110 without being moved, removed, or adjusted during use; they may be attached to frame 102, e.g., at vertical supports 110, by welding, secure bolts, or in a similar "permanent" fashion with the intent and understanding that the deck holders are not designed or expected to be moved or removed relative to frame 102 or a vertical support 110 during use to adjust the vertical position of the deck holder.

As illustrated, example frame 102 includes multiple such deck holders 118 located at multiple locations along a length of frame 102. Also optionally and as shown at FIGS. 8C, 8D, and 8E, multiple sets of deck holders 118 may be arranged together at different height locations periodically and regularly along the heights of vertical supports 110 to allow a removable deck to be supported within frame space 114 by any one of multiple available sets of deck holders 118, e.g., at a deck-holding height selected based on a maximum height of cargo pieces supported by a removable deck 120.

Also as shown, example removable deck 120 includes two side edges 142 that extend along the length of each length-wise side of removable deck 120. Side edges 142 include openings or gaps, or "notches" 144 that are sized and spaced relative to side edges 142 and deck holders 118 (within frame space 114) to allow removable deck 120, when oriented flat and horizontally within frame space 114, and while cargo is supported on top of the removable deck, to pass vertically through frame space 114 with deck holders 118 avoiding contact with side edges 142; i.e., when removable deck 120, in a flat and horizontal orientation, moves vertically through frame space 114, notches 144 align with and pass around deck holders 118 (which extend into frame space 114) to prevent contact between side edges 142 and deck holders 118; also while removable deck 120 moves vertically through the frame space, lengthwise segments of side edges 142 that are located between notches 144 pass through openings between deck holders 118 that are located along the length of frame 102, between the deck holders. See FIG. 8A.

Figures 8A, 8B:
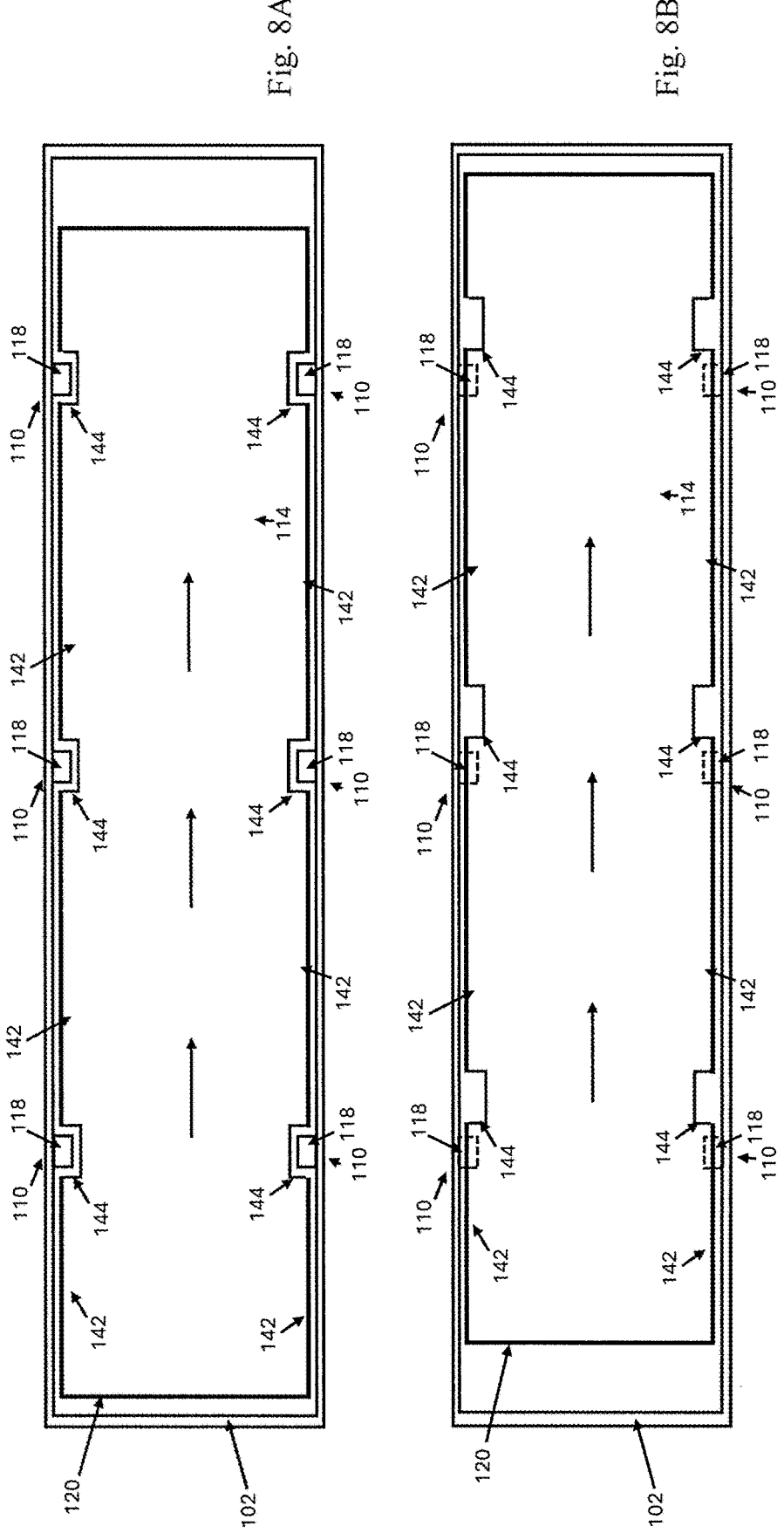
FIGS. 8A (top view), 8B (top view), 8C and 8D (side perspective views), and 8E (end view) show components of an example cargo-carrying system and example steps of loading a removable deck into a frame.

In use, a method of loading a deck 120 of FIG. 8A includes moving removable deck 120 vertically through frame space 114 (with removable deck 120 being held in a flat and horizontal orientation) with notches 144 aligned with deck holders 118 to allow notches 144 to pass around deck holders 118 to prevent contact between side edges 142 and deck holders 118 during the vertical movement. See FIGS. 8A and 8C. With removable deck 120 being moved vertically to a position above deck holders 118 of a desired deck-holding height, removable deck 120 can be moved horizontally within frame space 114 in a length direction to position a portion of side edge 142 above each deck holder 118. See FIGS. 8B and 8D. With a side edge 142 positioned above each deck holder 118, removable deck 120 can be lowered down vertically onto deck holders 118 to cause deck holders 118 to support the weight of removable deck 120 (and supported cargo) at a deck-holding height by supporting side edges 142 of removable deck 120.

According to example steps, and with reference to FIG. 8C, removable deck 120 is initially in a loading position (position I) below frame 102 with a length of removable deck 120 aligned with a length of frame space 114 of frame 102. While removable deck 120 is supported at the loading position (I) below frame 102 (see FIG. 8C), removable deck 120 can be moved vertically (step i) through bottom opening 112 of frame bottom 108, into frame space 114 (position II).

From position II, removable deck 120 is moved vertically upward, with deck holders 118 aligned with notches 144 of removable deck 120. See FIG. 8C. The removable deck is lifted vertically (ii) relative to deck holders 118 and vertical supports 110, with deck holders 118 passing through notches 144, to a position that is above a selected set of deck holders 118 of a deck-holding height (position III).

As shown at FIGS. 8C and 8D, with removable deck 120 positioned (position III, FIG. 8C) above a set of deck holders 118 of a selected deck-holding height, removable deck 120 is moved horizontally (iii) (FIGS. 8B and 8D) to position side edges 142 above each deck holder 118 (see FIG. 8B). With a side edge 142 positioned above each deck holder 118, removable deck 120 can be lowered down vertically onto deck holders 118 (movement iv at FIG. 8D) to cause deck holders 118 to support the weight of removable deck 120 in frame space 140 (position IV, see also FIG. 8E (end view)), by providing support at side edges 142. This sequence of loading removable deck 120 into frame 102 can be performed in a reverse order to unload removable deck 120 from frame 102.

FIGS. 9A, 9B, 9C, and 9D show example trailer 10 of FIGS. 1G through 1I, which includes optional aft-space 20 located at aft-end 14, aft opening 222 and door 224 to selectively open and close aft opening 222.

Figure 9A:
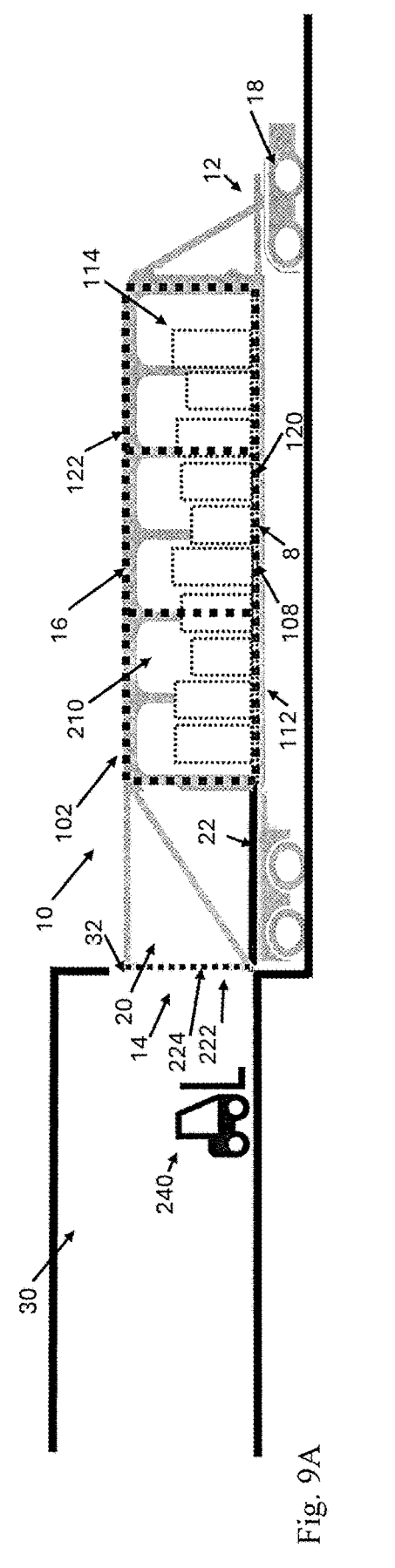
FIGS. 9A, 9B, 9C, 9D, 9E, and 9F show example bottom-loading trailers and example methods of unloading the trailer at a loading dock.
Figure 9B:
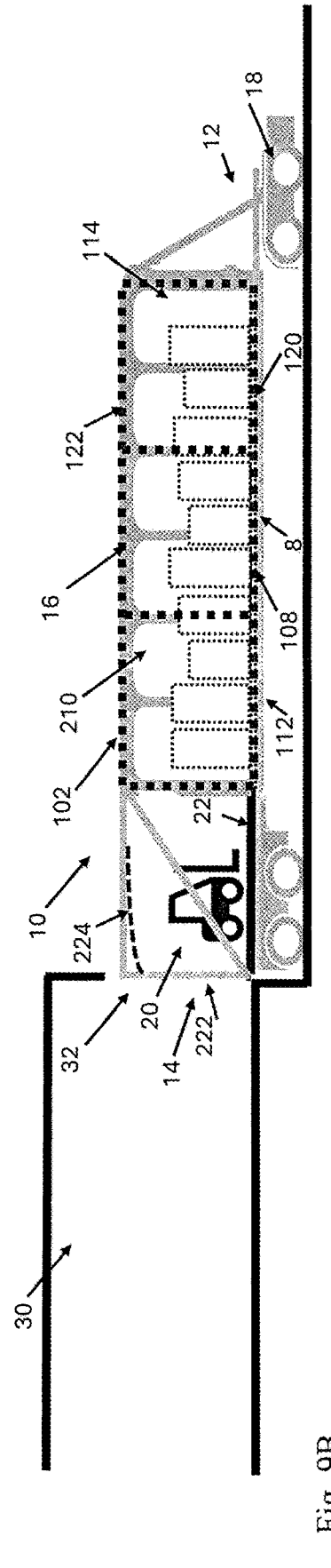
Figures 9C, 9D:
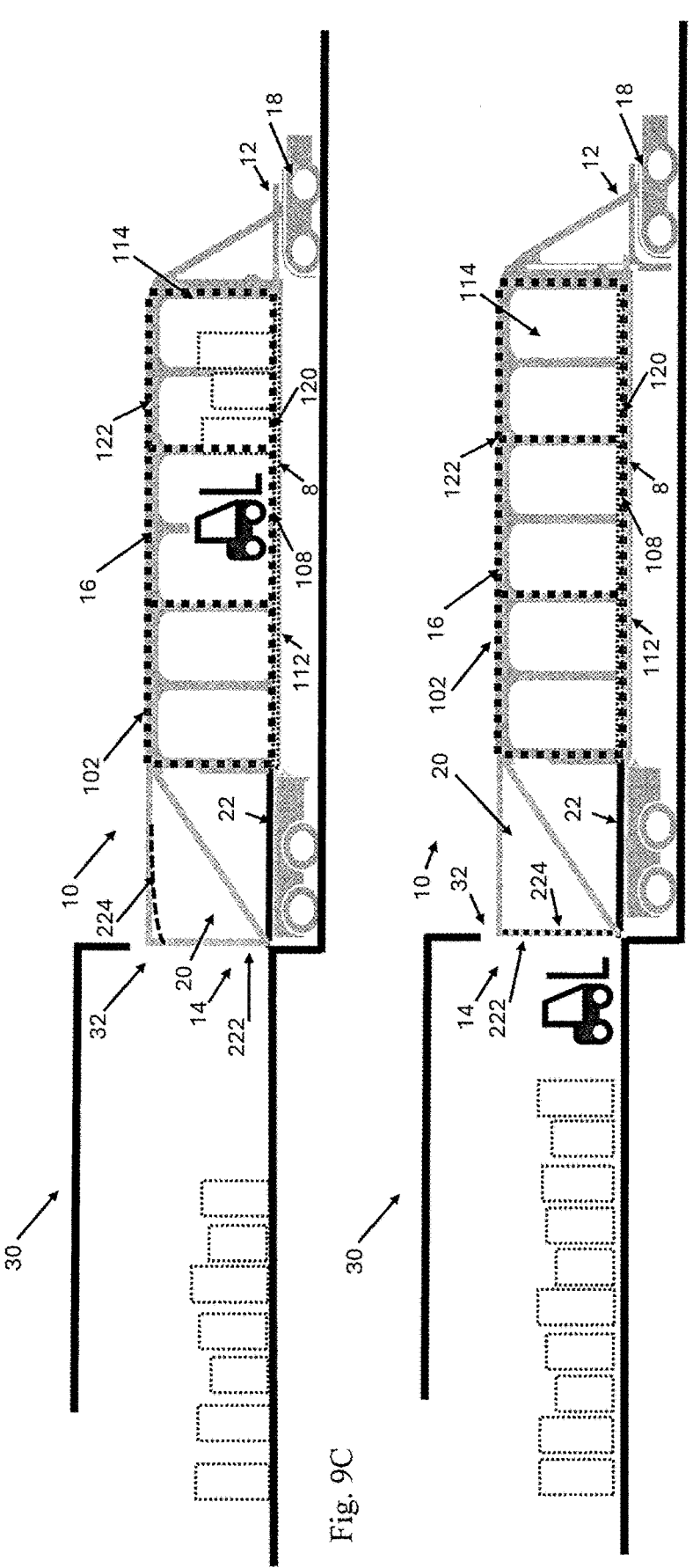

In use, as shown at FIG. 9A, the aft end of trailer 10 is positioned at dock door 32 of loading dock 30. Trailer 10, a bottom-loading trailer as described, includes removable deck 120 supported by frame 102 within frame space 114, and cargo 210 supported by removable deck 120. To unload cargo 210 from trailer 10 into dock 30, door 224 at the aft end of trailer 10 is opened to allow access between dock 30 and aft-space 20. With door 224 open (see FIG. 9B), a cargo mover (e.g., forklift 240) moves across aft-deck 22 to pick up pieces of cargo 210 and move those pieces of cargo 210 into loading dock space 30. See FIGS. 9C and 9D.

Optionally, but not shown in FIGS. 9A through 9D, trailer 10 can include loose cargo (e.g., 230) within aft-space 20, as shown at FIG. 1I, which can be moved (unloaded) from aft-space 20 prior to removing cargo 210 from frame space 114.

Loading cargo 210 (and optional loose cargo 230) onto trailer 10 can be performed in a sequence that is opposite of the loading sequence shown by FIGS. 9A through 9D.

Optionally, as another loading or unloading option, removable shelf 120 may be loaded or unloaded into or from frame space 114 through bottom opening 112 by a bottom-loading method as described herein, while loose cargo 230 is loaded and unloaded into aft-space 20 through aft opening 222.

Figure 9E:
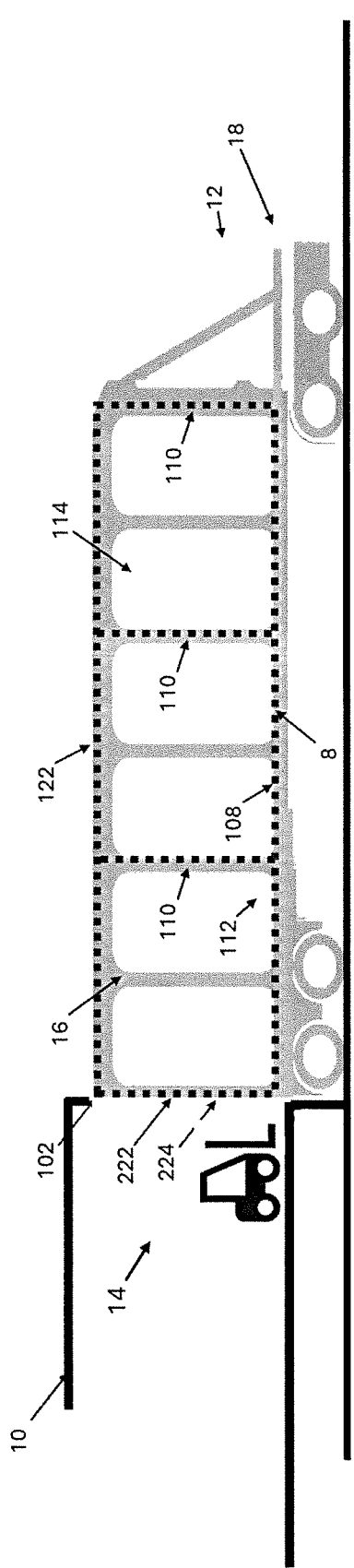
Figure 9F:
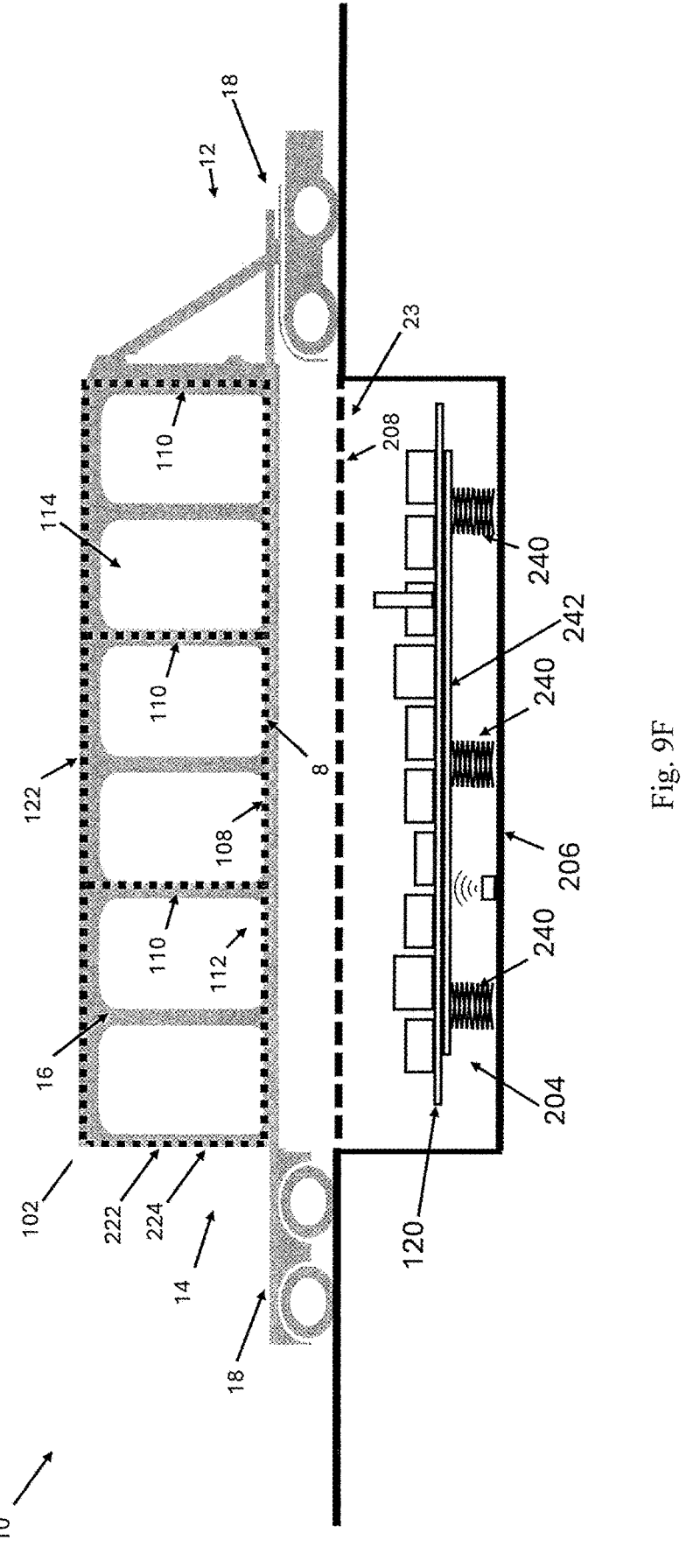

FIGS. 9E and 9F show another example of a bottom-loading trailer 10 that includes an aft-opening 222, and also includes movable wheel sets, which may as described in FIGS. 1J and 1K or may have a different movable design. The illustrated bottom-loading trailer 10, when supporting a single removable deck 120 (not shown) at a bottom of frame 102, may alternately be end-loaded through aft-opening 222 (e.g., by moving cargo from the deck and through aft opening 222), or may be loaded and unloaded by removing the removable deck 120 from trailer 10 with its cargo through bottom opening 8.

Other example bottom-loading trailers with moving wheel sets, for example bottom-loading trailer 10 of FIGS. 1L and 1M, may be similarly loaded and un-loaded, e.g., either by using a forklift to remove cargo from a removable deck 120 supported by the trailer, or by removing the removable deck 120 from the bottom-loading trailer through bottom opening 8.

Figure 10A:
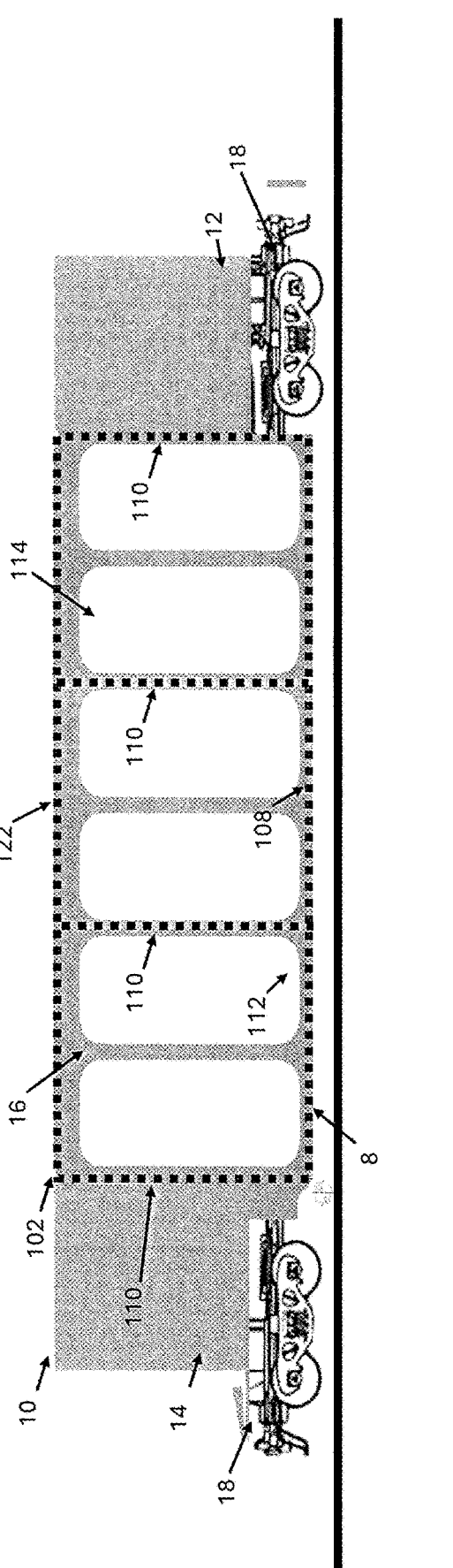
FIGS. 10A, 10B, and 10C, are side views of an example bottom-loading railcar and loading system as described.
Figure 10B:
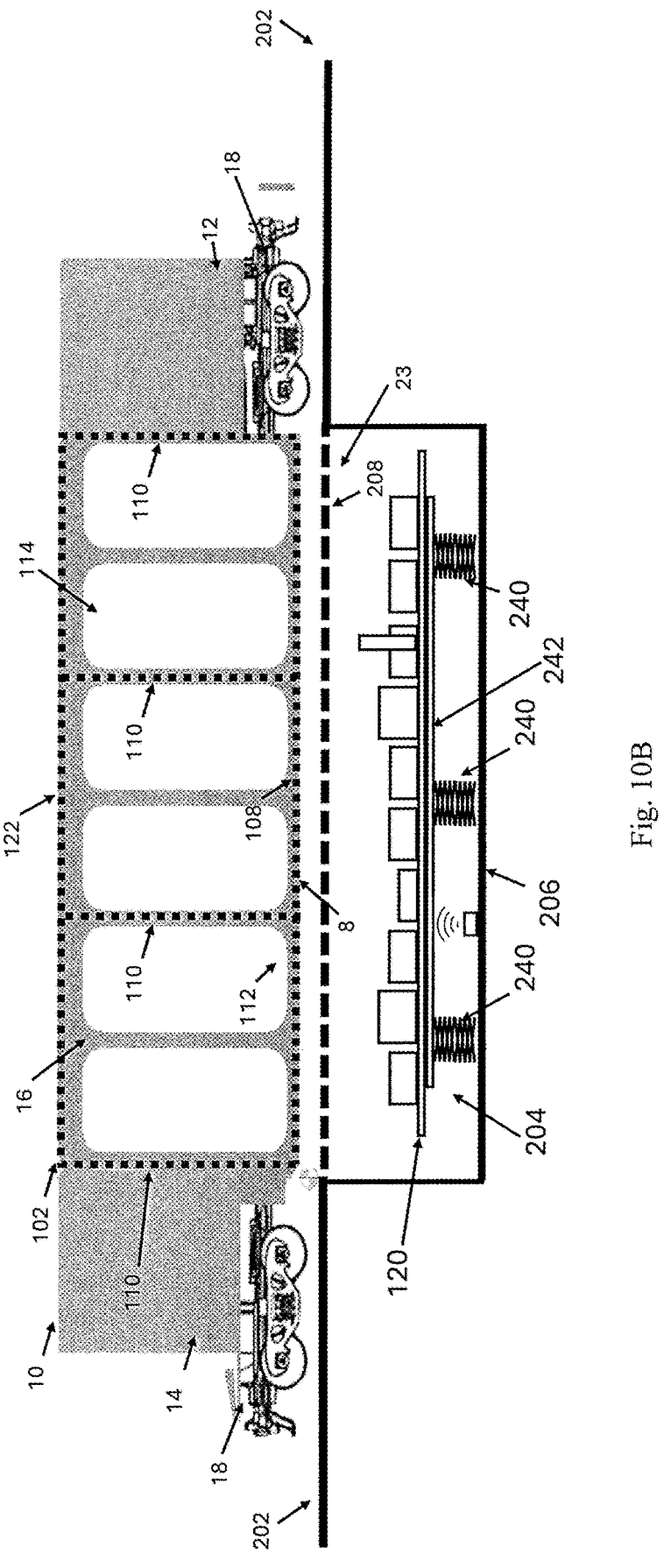
Figure 10C:
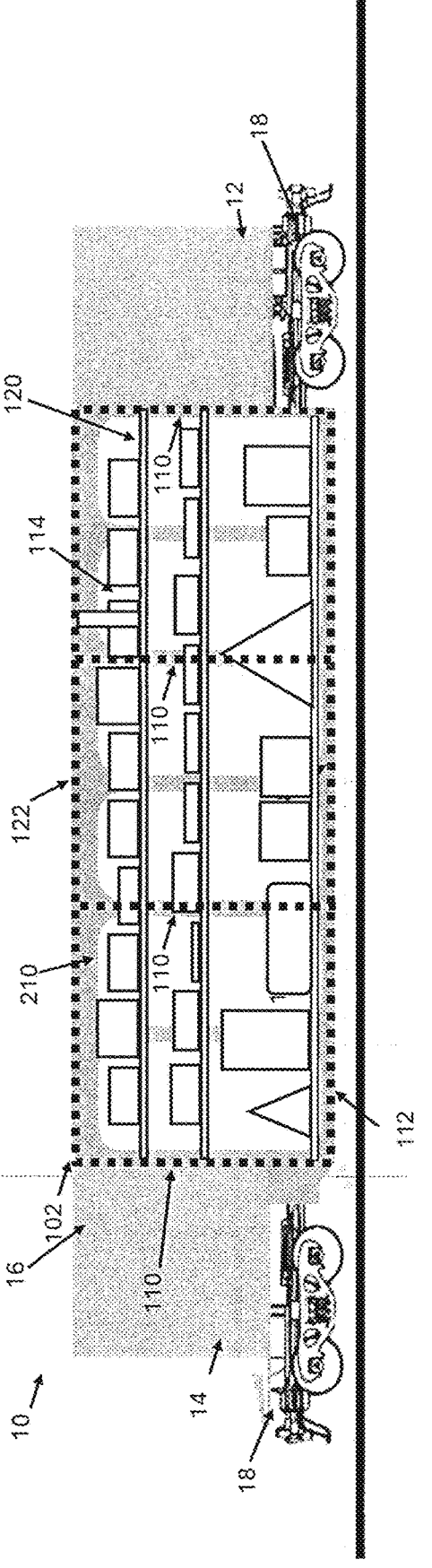

FIGS. 10A, 10B, and 10C show example bottom-loading railcar 10 that includes a cargo-carrying system that includes frame 102, that can be used with removable decks 120, and deck holders (not specifically shown). Decks 120 support cargo 210 as described elsewhere and can be intermodal decks that can be transferred between two transportation modes and two different cargo transport vessels, e.g., between a bottom-loading railcar and a bottom-loading trailer as described, while cargo remains supported on the deck.

Railcar 10 includes front end 12, aft end 14, and body 16 which connects front end 12 with aft end 14 and supports and optionally includes or incorporates frame 102, and which includes bottom opening 8 adapted to correspond to bottom opening 112 of frame 102. Frame 102 includes vertical supports 110 in the form of vertical posts (as illustrated), frame top 122, and frame bottom 108 (including bottom opening 112), which together define three-dimensional frame space 114 therebetween. Railcar front end 12 and railcar aft end 14 are supported by wheel sets 18, which include wheels and axles.

At FIG. 10B, railcar 10 is positioned above a loading station that includes a loading platform space and loading platform as described herein, including gate 22 above loading platform space 204. At FIG. 10C, decks 120, with cargo, have been loaded into frame 102 from below frame 102 by lifting each deck 120 vertically through bottom opening 112 of frame 102, then supporting each deck at a deck-holding height within frame 102.

The present description relates to loading and unloading methods and system as described above and as follows. Generally, the present disclosure includes descriptions of methods of loading a removable deck or multiple removable decks from a position below a bottom-loading frame, through a bottom opening in the frame, into a frame space of the frame, and supporting the one or multiple removable decks within the frame space such as with multiple deck holders that allow the removable deck and cargo supported by the deck to be mechanically supported by the frame.

Example loading methods use a vertically-movable loading platform to support the removable deck and cargo supported by the deck while the removable deck is moved vertically from below the frame, upward through the bottom opening into the frame space, and vertically within the frame space. According to example loading methods, a vertically-movable loading platform can be positioned below the frame and can be used to support the removable deck at a position below the frame and then move the removable deck vertically into the frame space of the frame. Once positioned vertically as desired within the frame space, the removable deck can be supported by the frame, e.g., through one or more deck holders, and the loading platform can be lowered and removed from the frame space through the bottom opening. Example bottom-loading frames may be incorporated into a bottom-loading cargo transport vessel such as a bottom-loading trailer, a bottom-loading railcar, or the like.

To remove (unload) the one or more removable decks from the bottom-loading frame, methods as described for loading the one or more removable decks onto a bottom-loading frame can be performed in a reverse order. According to example steps of methods of unloading a removable deck from a bottom-loading frame, a removable deck that is positioned and supported by a frame within a frame space of the frame, and that includes cargo supported on the removable deck, can be removed from the frame space by being supported within the frame space by the loading platform and then moved vertically downward (lowered) through the bottom opening in the bottom-loading frame to a position below the frame, such as a loading platform space.

Example loading platforms are vertically-movable, horizontally-oriented support structures that can be moved between positions below a frame space of a bottom-loading frame, and positions within the frame space of the bottom-loading frame. The loading platform is capable of supporting a removable deck at those positions and of vertically moving the removable deck between those positions to either load or to unload the removable deck onto or from the bottom-loading frame.

Example loading platforms may be supported by and vertically movable by movement of a hoist that supports the loading platform from below and moves the loading platform vertically between positions below and within the frame space. An example hoist may be of any useful form and design, such as a scissor hoist, a telescoping linear actuator, an in-floor hydraulic jack, or similar useful lifting devices. A hoist may be powered to support and vertically move a loading platform and a supported removable deck (loaded with cargo) by any useful power source, which may be an electric motor, pneumatic power, hydraulic power, or another useful source of power.

A loading platform includes an upper weight-bearing surface ("loading platform surface" or "platform surface") that is adapted to support the weight of the removable deck with cargo supported by the removable deck.

The platform surface may be a static surface that has no moving components and is not designed to facilitate horizontal movement of the removable deck supported on the loading platform surface, relative to the platform surface.

Alternately, the loading platform surface may be adapted to allow, facilitate, or cause (produce) horizontal movement of a removable deck relative to the loading platform, or to the loading platform surface, or relative to a frame space, or relative to a loading platform space. Such a surface may be referred to as a "moving loading platform surface, or "moving surface" for short. A moving loading platform surface may include one or more moving (i.e., movable) surfaces that are adapted to allow or facilitate movement, e.g., with reduced-friction, of a removable deck horizontally. A removable deck that is supported on a moving surface may be moved horizontally in a length direction or a width direction by applying a horizontal force to an end, side, or bottom of the removable deck. The horizontal force may be supplied by the loading platform, or by the moving surface, or by another device or moving structure that is external to and separate from the loading platform.

Examples of useful moving loading platform surfaces may incorporate a mechanical or fluid (e.g., air) bearing into the loading platform or loading platform surface to facilitate horizontal movement of a removable deck supported by the loading platform. Certain specific examples of moving loading platform surfaces include a moving surface that is connected directly or indirectly to a stationary (relative to the moving surface) support structure of the loading platform by a bearing, meaning a low friction bearing that is designed to reduce a force required to move a removable deck over the loading platform surface. A low friction bearing is a direct or indirect low-friction engagement between the loading platform or a component of the loading platform, and the moving surface, and may be of any useful type such as a mechanical bearing or fluid bearing, e.g., a ball bearing, a roller bearing, a fluid (e.g., hydraulic) bearing, an air bearing, etc., incorporated into the loading platform to support the moving surface while facilitating horizontal movement of the removable deck supported on the loading platform surface.

The form of the moving surface may be a rolling surface (e.g., a roller), a sliding surface (e.g., a sliding platform positioned above a moving surface), multiple rolling surfaces (rollers), a conveyor (belt), or another surface that is adapted to facilitate or produce movement of a removable deck in a horizontal direction relative to a loading platform, relative to a frame space, or relative to a loading platform space, considering that the removable deck may be loaded with cargo of significant mass.

Optionally, a moving surface may be powered, e.g., motorized, to produce and apply a force onto a bottom surface of a removable deck to produce a force on the removable deck, for example to move the removable deck relative to a frame space or a loading platform space.

The loading platform, the loading platform space, and a bottom-loading frame or a cargo transport vessel that includes the bottom-loading frame can be located at, used with, and incorporated into any of various commercial facilities according to a useful arrangement and position of the loading platform space. Example arrangements include a loading platform space positioned at a location that is effective to load and unload a bottom-loading cargo transport vessel is positioned on a transport deck, above the loading transport space. The loading transport space may be connected to a cargo-containing area such as a warehouse space, to allow multiple removable decks to be transferred between the cargo-containing area and the loading platform space.

According to example arrangements, which may be referred to as "loading systems" or "loading stations," a bottom-loading frame and a bottom-loading cargo transport vessel that includes the bottom-loading frame may be supported on a supporting surface referred to as a "deck" or a "transport deck" that is located above a loading platform space that contains the loading platform. An example loading station may include the transport deck positioned around a perimeter of a top of a loading platform space with relative positioning of the transport deck and the loading platform space to support and position the bottom-loading cargo transport vessel and the bottom-loading frame vertically above the loading platform space and vertically above a loading platform positioned within the loading platform space.

Example loading stations can include a transport deck that includes a loading platform space as an open space (pit or well) built into a transport deck, and a gate above the loading platform space that can be selectively an opened position and a closed position to selectively cover and uncover the loading platform space. The gate in the closed position is adapted to support the weight of a bottom-loading cargo transport vessel as the vessel is driven over the gate, i.e., rolled forward or in reverse the under power of a prime mover. With the vessel located above the loading platform space, the gate can be opened to allow access between the loading platform space and the bottom of the vessel, to allow removable decks to be loaded or unloaded onto or from the vessel through the bottom opening.

A transport deck of a loading station may be located within or connected to an interior or an exterior location of a commercial facility that includes a concrete or asphalt transport deck that is functionally proximal to a cargo-handling area of the facility at which cargo is moved, handled, or stored. The facility may be a facility that is used to load, unload, or transload cargo onto or from a cargo transport vessel such as a truck, ship, airplane, or railcar. Example facilities include railyards, trucking facilities, cargo storage facilities, warehouses, cargo processing facilities, cargo storage facilities, manufacturing facilities (factories), ports, etc.

An example facility and loading platform is show at FIG. 11. Facility 300 is any commercial cargo-handling facility that is useful to move, load, unload, or transfer cargo using a removable deck 120. As illustrated, facility 300 includes staging space 206 and loading platform space 204 adapted to load and unload removable decks 120 into bottom-loading trailers 10 positioned above loading platform space 204. Each loading platform space is positioned to be connected to warehouse space 300 by a staging space 206, which may be located beneath deck 202. Removable decks 120 can be moved through staging space 206 to be loaded onto and unloaded from a trailer 10. Each trailer 10 can be driven over a loading platform space 204, loaded or unloaded, then driven away in the same direction, forward, without being required to reverse into or over the loading platform space 204.

The described cargo-carrying systems, bottom-loading frames, bottom-loading cargo transport vessels, and loading stations can be used to transport cargo via one or multiple transport modes (truck, rail, ship, airplane) and over transport routes that include multiple legs between an origin and a destination, with intermediate destinations for loading, unloading, or transloading. By example methods: a removable deck and its cargo (a "laden deck") may be contained in a cargo transport vessel at an origin; transported over one or multiple transport legs; a laden deck may optionally be transloaded between different transportation modes (e.g., train, truck, or rail) for different legs; the laden deck may be transported over an single leg or multi-leg route from an origin to a destination with the original cargo being carried by the deck; and at the destination the laden deck or the cargo of the laden deck may be removed from a cargo transport vessel; movement of the cargo from the origin to the destination may be accomplished without removing the cargo from the removable deck.

Figure 12:
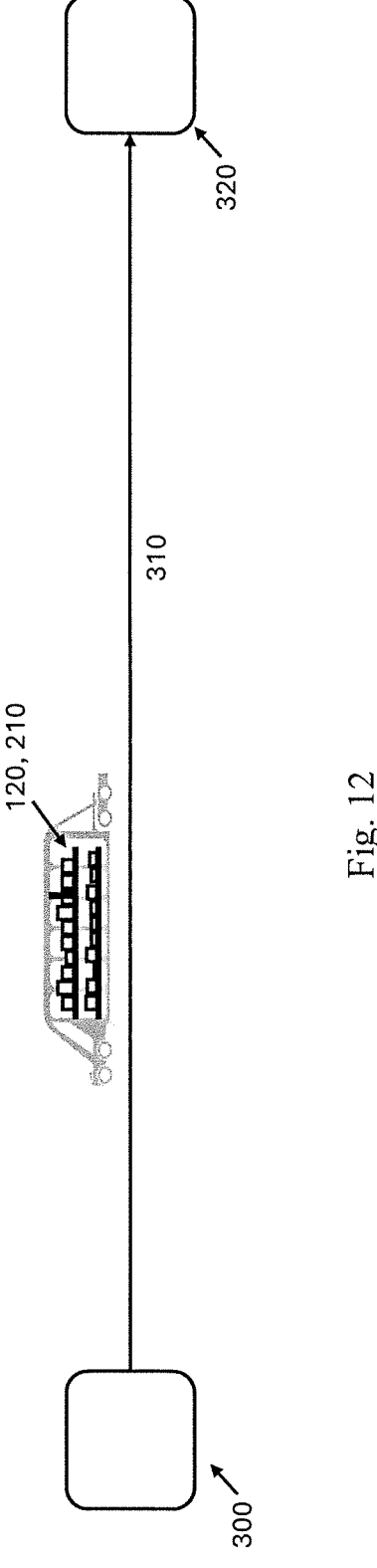
FIG. 12 schematically shows an example transport route using a bottom-loading trailer to transport removable decks as described.

By one example transport method, as shown at FIG. 12, at an origin facility 300, a removable deck 120, separate from a frame or a cargo transport vessel, may be loaded with cargo 210 by placing the cargo onto the removable deck. The laden deck may be loaded into a bottom-loading trailer. The trailer may be transported, over-the-road on route 310 to a destination facility 320. The laden deck (removable deck 120 with cargo 210) may be unloaded from the bottom-loading trailer at destination 320. At the destination, after the laden deck is removed from and separated from the bottom-loading trailer, the cargo 210 may be removed from the removable deck 120.

By alternate versions of this example method, the bottom-loading trailer may be end-loaded (or un-loaded) through an aft door at either origin facility 300 or destination facility 320 (see, e.g., FIGS. 9A through 9E), and bottom-loaded at either the destination facility 320 or origin facility 300, respectively.

Figure 13A:
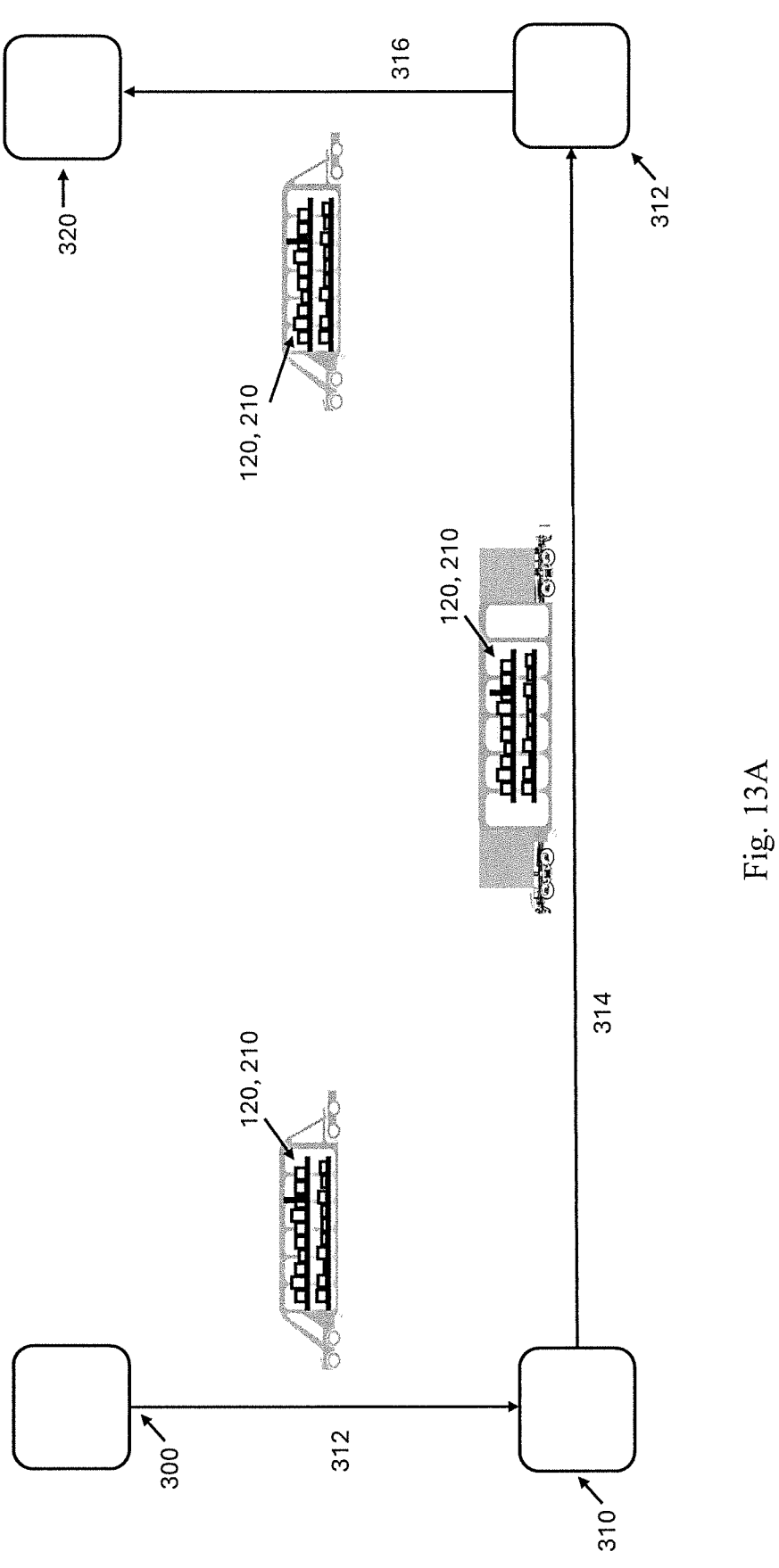
FIGS. 13A and 13B schematically show example transport routes that use a bottom-loading trailer and a railcar to transport intermodal removable decks as described.
Figure 13B:
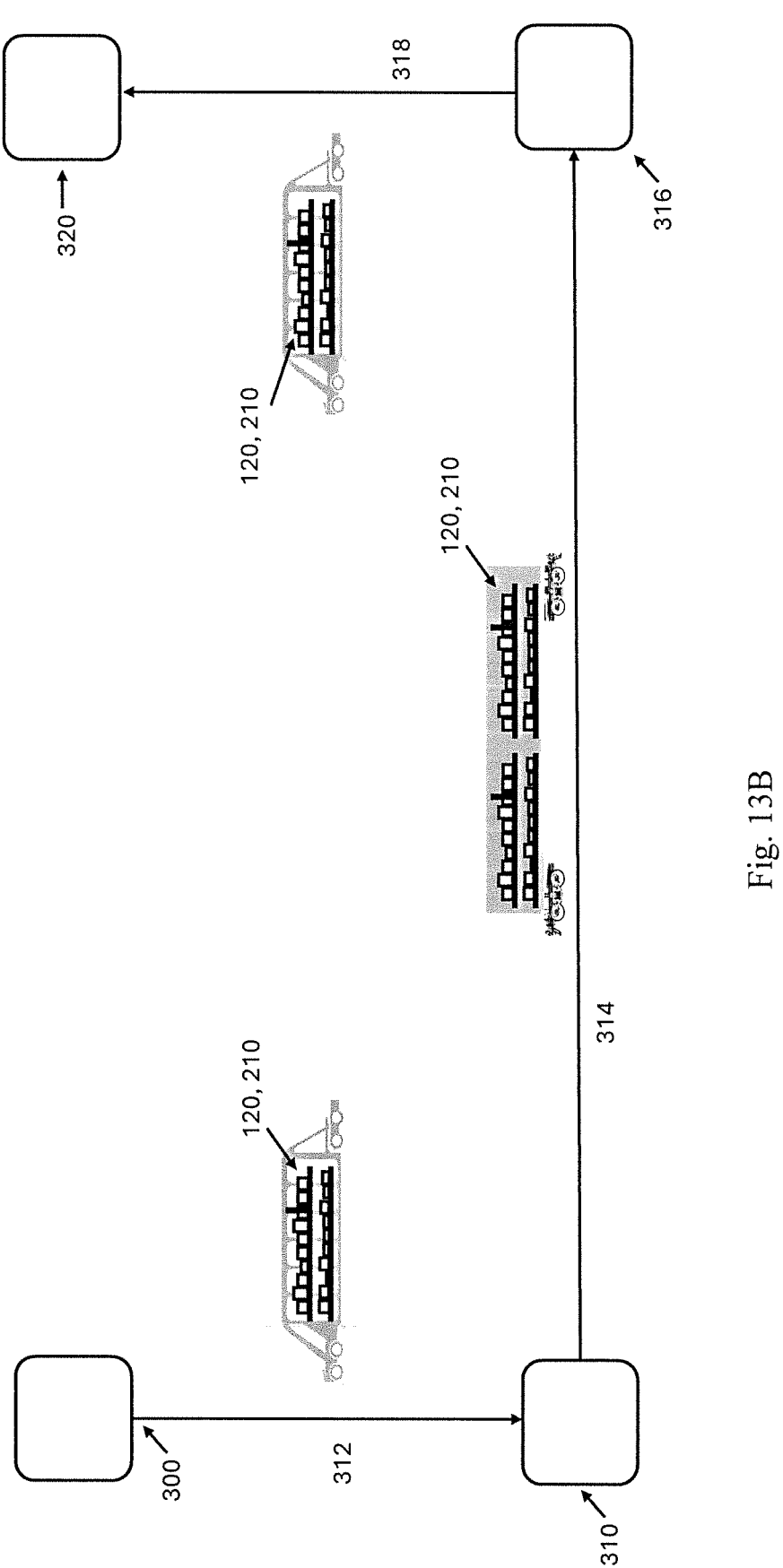

As shown at FIGS. 13A and 13B, at an origin facility 300, one or multiple removable decks 120, with cargo, may be loaded onto a bottom-loading trailer either by an end-loading method or by a bottom-loading method. The trailer may be transported, over-the-road, to an intermediate destination 310. The one or multiple removable decks 120 with cargo may be unloaded by a bottom-loading method from the bottom-loading trailer at destination 320 and then loaded onto a railcar without removing cargo from the deck. As shown at FIG. 13A, the railcar may be a bottom-loading railcar and the laden decks may be loaded into the railcar by a bottom-loading method. As shown at FIG. 13B, the railcar may be a top-loading railcar, in which case laden decks 120 may be trans-loaded onto a removable cargo carrier (not shown) and the removable cargo carrier may be loaded onto the top-loading railcar.

The railcar can be transported by rail on route 314 to intermediate destination 316, which may be transloading station. At intermediate destination 316, decks 120 with cargo may be unloaded from the railcar and then loaded onto a truck trailer, e.g., a bottom-loading trailer, and transported over-the-road on route 318 to destination 320. At destination 320 cargo 210 may be removed from the bottom-loading trailer by a bottom-loading (unloading) method that removes one or more laden decks 120 from the trailer through an open bottom; alternately, for a bottom-loading trailer that includes only a single removable deck 120, cargo 210 may be unloaded from the trailer by an end-loading method (see, e.g., FIGS. 9A through 9E).

The invention claimed is:

1. A method of loading cargo to a bottom-loading trailer, the trailer comprising:

a front end supported by front wheels, an aft end supported by aft wheels, and a cargo-carrying system comprising a frame comprising a frame bottom and a bottom opening in the frame bottom, and a removable deck adapted to be supported by the frame;

the method comprising:

moving the trailer over a transport deck to position the frame above a loading platform space that includes a loading platform, supporting the removable deck on the loading platform positioned in the loading platform space, with cargo supported by the removable deck, elevating the loading platform, the removable deck, and the cargo, through the bottom opening, and supporting the removable deck on the frame.

2. The method of claim 1, comprising:

supporting the removable deck on the frame at a deck-holding height using a deck holder engaged with the removable deck and with the frame, and removing the support of the removable deck provided by the loading platform.

3. The method of claim 2 comprising, with the deck holder engaged with the frame, and with the loading platform supporting the removable deck above the deck holder, lowering the loading platform to lower the removable deck onto the deck holder.

4. The method of claim 2, the system comprising a second removable deck adapted to be supported by the frame by a second deck holder that is adapted to engage the second removable deck and the frame to support the second removable deck, the method comprising, with the removable deck supported at the deck-holding height:

supporting the second removable deck on the loading platform with cargo supported by the second removable deck, elevating the loading platform, the second removable deck and cargo supported on the second removable deck through the bottom opening, supporting the second removable deck on the frame at a second deck-holding height using the second deck holder engaged with the second removable deck and with the frame, and removing the support for the second removable deck provided by the loading platform.

5. The method of claim 1, comprising lowering the loading platform into the loading platform space.

6. The method of claim 1, wherein the removable deck comprises a side edge, the side edge comprises a notch, the frame comprises a deck holder attached to the frame, and the method comprises aligning the notch with the deck holder while elevating the loading platform and the removable deck with the deck holder passing through the notch.

7. The method of claim 1, wherein the removable deck comprises two side edges, each side edge comprises multiple notches, the frame comprises multiple deck holders, and the method comprises elevating the removable deck with the deck holders passing through the notches.

8. The method of claim 1, wherein the removable deck comprises two side edges, each side edge comprises multiple notches, the frame comprises multiple deck holders aligned vertically, and the method comprises elevating the removable deck with the deck holders passing through the notches.

9. The method of claim 7, comprising moving the removable deck vertically to a height above the deck holders, moving the removable deck horizontally above the deck holders, and lowering the removable deck to cause the side edges to be supported by the deck holders.

10. The method of claim 1, comprising transporting the trailer, removable deck, and cargo to a destination, removing the removable deck with the cargo supported on the removable deck from the trailer, and replacing the removable deck on the frame with a second removable deck.

11. The method of claim 1, wherein the loading platform space is located at an origin, the method comprising:

transporting the trailer with the removable deck and the cargo from the origin to a destination, and at the destination, removing the removable deck with the cargo supported on the removable deck from the trailer through the bottom opening.

12. The method of claim 11, comprising, at the destination:

moving the trailer over a transport deck to position the frame above a loading platform space that contains a loading platform, elevating the loading platform from the loading platform space, through the bottom opening, and supporting the removable deck within a frame space, and lowering the loading platform, the removable deck, and the cargo, through the bottom opening and into the loading platform space.

13. The method of claim 1, comprising transporting the trailer, removable deck, and cargo to a destination, removing the removable deck with the cargo supported on the removable deck from the trailer, and loading the removable deck with the cargo supported on the removable deck into a cargo transport vessel.

14. The method of claim 13, wherein the cargo transport vessel is a second bottom-loading trailer.

15. The method of claim 13, wherein the cargo transport vessel is a railcar.

16. The method of claim 13, wherein the cargo transport vessel is a bottom-loading railcar.

* * * * *